(12) United States Patent
Lin et al.

(10) Patent No.: US 10,776,347 B2
(45) Date of Patent: Sep. 15, 2020

(54) PATTERN MINING METHOD, HIGH-UTILITY ITEMSET MINING METHOD, AND RELATED DEVICE

(71) Applicant: TENCENT TECHNOLOGY (SHENZHEN) COMPANY LIMITED, Shenzhen, Guangdong (CN)

(72) Inventors: Chun-wei Lin, Shenzhen (CN); Lei Xiao, Shenzhen (CN); Wei Chen, Shenzhen (CN); Jiexiong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 182 days.

(21) Appl. No.: 16/022,891

(22) Filed: Jun. 29, 2018

(65) Prior Publication Data
US 2018/0307722 A1    Oct. 25, 2018

Related U.S. Application Data

(63) Continuation of application No. PCT/CN2017/102663, filed on Sep. 21, 2017.

(30) Foreign Application Priority Data

Sep. 27, 2016 (CN) .......................... 2016 1 0856770
Sep. 28, 2016 (CN) .......................... 2016 1 0866557

(51) Int. Cl.
G06F 16/22  (2019.01)
G06F 16/23  (2019.01)
(Continued)

(52) U.S. Cl.
CPC ...... *G06F 16/2379* (2019.01); *G06F 16/2246* (2019.01); *G06F 16/2365* (2019.01); *G06F 16/2465* (2019.01); *G06F 16/28* (2019.01)

(58) Field of Classification Search
CPC ............. G06F 16/2379; G06F 16/2246; G06F 16/2465; G06F 16/28; G06F 16/2365; G06F 2216/03; G06Q 30/06
(Continued)

(56) References Cited

U.S. PATENT DOCUMENTS

2009/0018994 A1* 1/2009 Hajdukiewicz ..... G06F 16/2477
2014/0201225 A1* 7/2014 Deshmukh .............. G06F 16/20
707/758

(Continued)

*Primary Examiner* — Usmaan Saeed
*Assistant Examiner* — Jessica N Le
(74) *Attorney, Agent, or Firm* — Sughrue Mion, PLLC

(57) ABSTRACT

A pattern mining method includes obtaining, according to each of transactions comprised in a transactional database, a candidate pattern set satisfying a condition, each of the transactions comprising at least one item, each of candidate patterns in the candidate pattern set comprising one or more items in an itemset, calculating a utility of a respective one of the candidate patterns in each of the transactions, determining, among the transactions, at least one target transaction in which the utility reaches a specified utility threshold, determining a target period value of a target candidate pattern corresponding to the at least one target transaction, according to a target time attribute of each of the at least one target transaction, and determining the target candidate pattern as a mining result, based on the target period value of the target candidate pattern being less than or equal to a period threshold.

15 Claims, 20 Drawing Sheets

(51) Int. Cl.
  *G06F 16/28*      (2019.01)
  *G06F 16/2458*   (2019.01)
(58) Field of Classification Search
  USPC .......................................................... 707/703
  See application file for complete search history.

(56) References Cited

U.S. PATENT DOCUMENTS

2015/0317363 A1* 11/2015 Manzano Macho ... G06N 20/00
                                                  706/12
2016/0179827 A1*  6/2016 Gnech ................. G06F 16/2365
                                                  707/690
2016/0283584 A1*  9/2016 Dubost ................. G06F 16/285
2017/0351731 A1* 12/2017 Brosch ................. G06F 16/2358
2018/0268015 A1*  9/2018 Sugaberry ............. G06N 3/063

* cited by examiner

| D | | |
|---|---|---|
| tid | iu | ru |
| 1 | 27 | 8 |
| 2 | 9 | 18 |
| 4 | 9 | 15 |
| 5 | 27 | 42 |
| 6 | 18 | 24 |
| 7 | 9 | 41 |
| 9 | 18 | 5 |
| 10 | 9 | 14 |

| C | | |
|---|---|---|
| tid | iu | ru |
| 1 | 2 | 6 |
| 3 | 5 | 12 |
| 4 | 3 | 12 |
| 7 | 2 | 39 |
| 8 | 3 | 12 |
| 9 | 2 | 3 |
| 10 | 2 | 12 |

| A | | |
|---|---|---|
| tid | iu | ru |
| 1 | 6 | 0 |
| 2 | 12 | 6 |
| 4 | 6 | 6 |
| 8 | 12 | 0 |
| 10 | 12 | 0 |

| B | | |
|---|---|---|
| tid | iu | ru |
| 3 | 12 | 0 |
| 5 | 36 | 6 |
| 6 | 24 | 0 |
| 7 | 36 | 3 |

| E | | |
|---|---|---|
| tid | iu | ru |
| 2 | 6 | 0 |
| 4 | 6 | 0 |
| 5 | 6 | 0 |
| 7 | 3 | 0 |
| 9 | 3 | 0 |

FIG. 13

PATTERN MINING METHOD, HIGH-UTILITY ITEMSET MINING METHOD, AND RELATED DEVICE

CROSS-REFERENCE TO RELATED APPLICATIONS

This application is a continuation of International Patent Application No. PCT/CN2017/102663 filed on Sep. 21, 2017, which claims priority from Chinese Patent Application No. 201610856770.5, filed in the Chinese Patent Office on Sep. 27, 2016, and entitled "PATTERN MINING METHOD AND APPARATUS," and claims priority from Chinese Patent Application No. 201610866557.2, filed in the Chinese Patent Office on Sep. 28, 2016, and entitled "HIGH-UTILITY ITEMSET MINING METHOD AND APPARATUS, AND DATA PROCESSING DEVICE," all of which are incorporated herein by reference in their entireties.

BACKGROUND

1. Field

Methods and apparatuses consistent with embodiments relate to the field of data mining technologies, and specifically, to a pattern mining method, a pattern mining apparatus, a high-utility itemset mining (HUIM) method, an HUIM apparatus, and a data processing device.

2. Description of Related Art

In a high-utility mining technology, a transactional database is a database in which transactions such as a trade and news can be recorded. At least one transaction is recorded in the transactional database, and each transaction includes at least one data item, that is, an item. For example, at least one transaction related to a trade record may be recorded in a transactional database of a trade type, and one transaction related to a trade record may include a data item of at least one commodity (the data item of the commodity may correspond to a commodity name) and quantities of various traded commodities. To represent an association rule between data items in the transactional database, an itemset is formed by the at least one data item.

A transactional database of a trade type or the like can reflect a preference of a user. Therefore, when information is recommended to the user, an itemset to be recommended to the user may be obtained through mining from multiple itemsets formed in the transactional database, and during mining of an itemset, e.g., an itemset with relatively high utility (a high-utility itemset (HUI) for short) may be considered.

An HUI is an itemset with relatively high utility, and there may be one or more data items in the itemset. How to comprehensively consider utility of each data item in the itemset to improve accuracy of an HUI obtained through mining is a consideration.

SUMMARY

According to embodiments, there is provided A pattern mining method, the pattern mining method being performed by a server, and the pattern mining method including obtaining, according to each of transactions included in a transactional database, a candidate pattern set satisfying a condition, each of the transactions including at least one item, each of candidate patterns in the candidate pattern set including one or more items in an itemset, and the itemset being generated according to the at least one item in each of the transactions. The pattern mining method further includes, for each of the candidate patterns in the candidate pattern set, calculating a utility of a respective one of the candidate patterns in each of the transactions, and determining, among the transactions, at least one target transaction in which the utility reaches a specified utility threshold. The pattern mining method further includes determining a target period value of a target candidate pattern corresponding to the at least one target transaction, according to a target time attribute of each of the at least one target transaction, and determining the target candidate pattern as a mining result, based on the target period value of the target candidate pattern being less than or equal to a period threshold.

According to embodiments, there is provided a pattern mining apparatus including at least one memory configured to store computer program code, and at least one processor configured to access the at least one memory and operate according to the computer program code. The computer program code includes candidate pattern set obtaining code configured to cause the at least one processor to obtain, according to each of transactions included in a transactional database, a candidate pattern set satisfying a condition, each of the transactions including at least one item, each of candidate patterns in the candidate pattern set including one or more items in an itemset, and the itemset being generated according to the at least one item in each of the transactions. The computer program code further includes utility calculation code configured to cause the at least one processor to, for each of the candidate patterns in the candidate pattern set, calculate a utility of a respective one of the candidate patterns in each of the transactions, and target transaction determining code configured to cause the at least one processor to determine, among the transactions, at least one target transaction in which the utility reaches a specified utility threshold. The computer program code further includes candidate pattern period value determining code configured to cause the at least one processor to determine a target period value of a target candidate pattern corresponding to the at least one target transaction, according to a target time attribute of each of the at least one target transaction, and mining result determining code configured to cause the at least one processor to determine the target candidate pattern as a mining result, based on the target period value of the target candidate pattern being less than or equal to a period threshold.

According to embodiments, there is provided a high-utility itemset mining (HUIM) method, the HUIM method being performed by a server, and the HUIM method including determining an itemset utility corresponding to each of itemsets in a transactional database, the itemset utility indicating a sum of utilities of target transactions corresponding to a respective one of the itemsets, each of the target transactions including data items in the respective one of the itemsets, and a utility of one of the target transactions indicates a sum of utilities of the data items. The HUIM method further includes determining, according to a predefined minimum utility (MMU) threshold table, a minimum itemset utility (MIU) threshold corresponding to each of the itemsets, the predefined MMU threshold table recording an MMU threshold corresponding to each data item, and an MIU threshold table corresponding to one itemset indicating a least minimum utility (LMU) threshold among MMU thresholds corresponding to data items included in the one itemset. The HUIM method further includes comparing the itemset utility of each of the itemsets with the MIU threshold, and determining a high-utility itemset (HUI), according to a result of the comparing, an itemset utility of the HUI being not less than the MIU threshold.

BRIEF DESCRIPTION OF THE DRAWINGS

FIG. 13 is a schematic diagram of utility lists corresponding to itemsets at a first layer of an MIU tree.

DETAILED DESCRIPTION OF EMBODIMENTS

Figure 1:
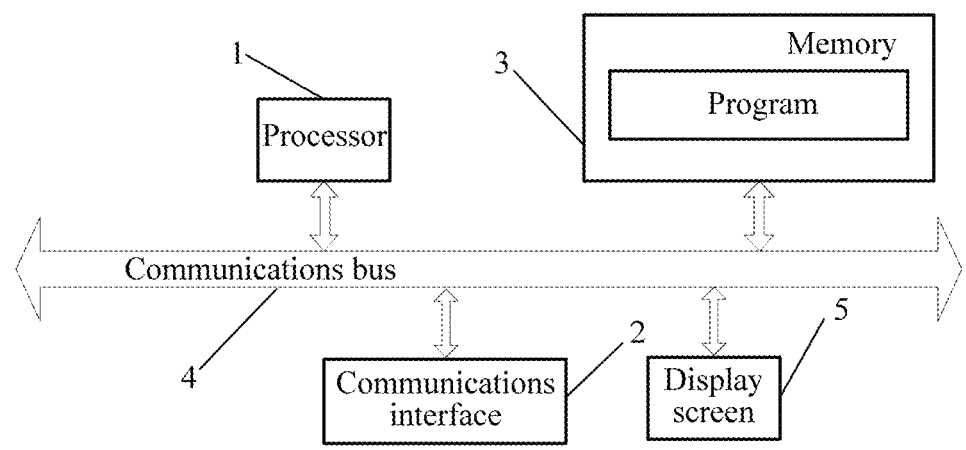
FIG. 1 is a schematic diagram of a hardware structure of a server according to an embodiment.

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Before the solutions in this application are described, concepts of pattern mining are briefly described first.

Using a commodity sales record in a supermarket as an example, the commodity sales record is used to record content of a shopping list of a customer. The shopping list of the customer includes information related to a bought commodity, such as a commodity name and a commodity quantity. A high-utility pattern mining manner is used to find, from the shopping list, a commodity combination with a relatively high sales volume or a high profit, and a sales strategy is changed by using the found commodity combination, to improve a sales profit. The foregoing example is abstracted into a pattern mining model, which includes an item corresponding to a bought commodity and a transaction corresponding to the shopping list. All shopping lists are stored in a transactional database, and the transactional database includes one or more transactions. One transaction includes at least one item. An itemset is generated according to the item included in the transaction. Pattern mining is to obtain through mining an item satisfying a condition from the itemset.

In this application, a period and utility are combined, and a period based high-utility pattern mining method is provided. Utility of a preliminarily obtained candidate pattern set in each transaction is calculated. For a transaction in which the utility does not reach a specified utility threshold, because such a type of transaction has excessively low utility, and contributes little to total utility, to avoid a waste of a mining and calculation time, such a type of transaction may be deleted. Further, a period value of a candidate pattern is calculated by using a time attribute of a remaining transaction, and a candidate pattern whose period value is less than or equal to a specified period threshold is used as a mining result for reservation. Such a type of pattern has relatively high utility in each period, which facilitates fast decision-making.

A period value of a pattern is determined according to a time attribute of each specified transaction including the pattern. In each specified transaction including the pattern, a largest time difference in time differences between adjacent transactions is determined as the period value of the pattern. The specified transaction including the pattern may be all specified transactions including the pattern or may be some transactions selected, according to a condition, from all transactions including the pattern.

A pattern mining method provided in an embodiment of this application is implemented based on a server. Before the pattern mining method in this application is described, the server is described first. The server may be a processing device such as a computer or a notebook computer.

FIG. 1 is a schematic diagram of a hardware structure of a server according to an embodiment. As shown in FIG. 1, the server may include a processor 1, a communications interface 2, a memory 3 including a program, a communications bus 4, and a display screen 5.

The processor 1, the communications interface 2, the memory 3, and the display screen 5 complete mutual communication by using the communications bus 4.

The pattern mining method in this application is described below with reference to the hardware structure of the server.

Figure 2:
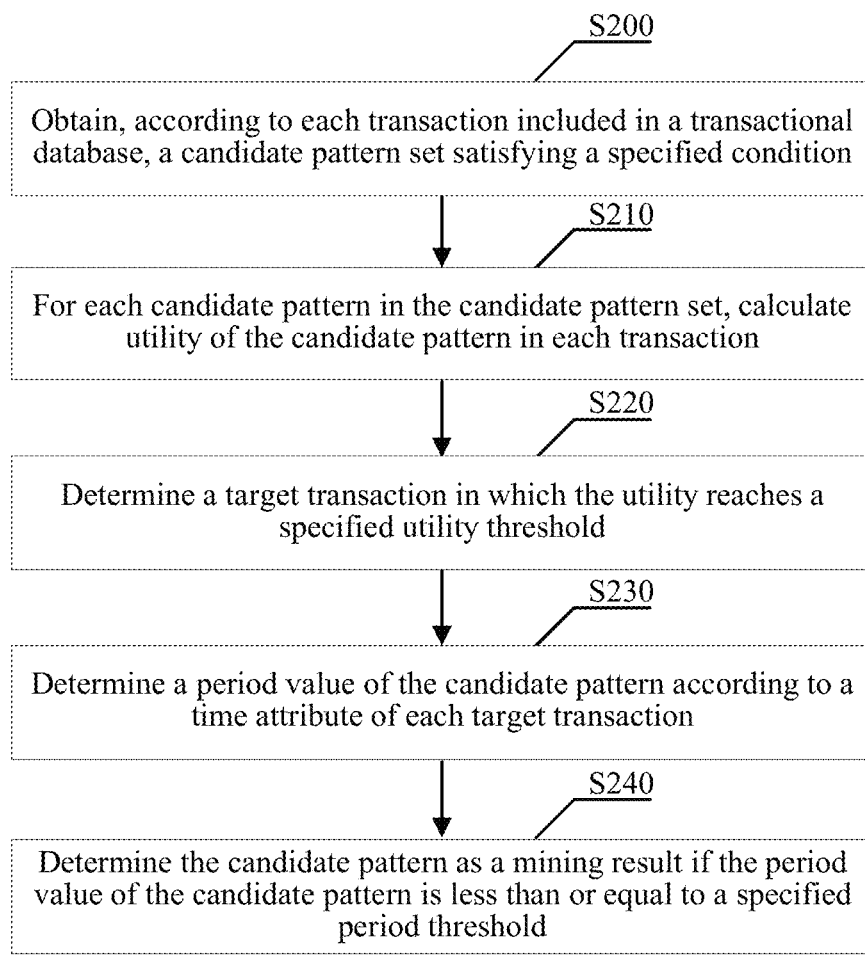
FIG. 2 is a flowchart of a pattern mining method according to an embodiment.

FIG. 2 is a flowchart of a pattern mining method according to an embodiment. As shown in FIG. 2, the method is applied to a server, and includes the following steps.

Step S200: Obtain, according to each transaction included in a transactional database, a candidate pattern set satisfying a specified condition.

Each transaction includes at least one item; each candidate pattern in the candidate pattern set includes an item in at least one itemset; and the itemset is a set generated according to the item in each transaction.

The transactional database is scanned by using the specified condition, to obtain the candidate pattern set satisfying the specified condition. The specified condition may include a condition for limiting a value of utility of the candidate pattern. During implementation, in this embodiment of this application, the value of the utility is not limited.

During implementation on the server, the transactional database may be prestored in a memory 3 by using a communications interface 2. During mining, the specified condition is input by using the communications interface 2, and a processor 1 queries, by using a communications bus 4, the database stored in the memory for the candidate pattern set satisfying the specified condition.

Optionally, the communications interface 2 may be an interface of a communications module, for example, an interface of a GSM module. Optionally, the processor 1 may be a central processing unit (CPU), an application-specific integrated circuit (ASIC), or one or more integrated circuits configured to implement this embodiment of this application.

Step S210: For each candidate pattern in the candidate pattern set, calculate utility of the candidate pattern in each transaction.

A transaction that is in the transactional database and that includes a candidate pattern may be determined by scanning the transactional database, and utility of the candidate pattern in the transaction is calculated.

An example is used for description. The transactional database includes three transactions, which are respectively (2a, 3b, c), (a, 2b, 3d), and (b, 3c, 4d), where a, b, c, and d are four items. A digit before an item included in each transaction indicates a quantity of corresponding items included in the transaction, for example, the transaction (2a, 3b, c) includes two items a, three items b, and one item c.

Assuming that a candidate pattern is [a, b], it may be determined, by scanning the transactional database, that transactions including the candidate pattern are (a, b, c) and (a, b, d), and utility of the candidate pattern in the foregoing two transactions are separately calculated. For a transaction that is in the transactional database and that does not include a candidate pattern, utility of the candidate pattern in the corresponding transaction is 0. During implementation, the processor 1 may calculate the utility of the candidate pattern in each transaction.

Step S220: Determine a target transaction in which the utility reaches a specified utility threshold.

In this embodiment of this application, a user may preset a utility threshold of a pattern in each transaction and a period threshold of the pattern according to a requirement. In step S210, the utility of the candidate pattern in each transaction is obtained, so that the target transaction in which the utility reaches the specified utility threshold can be determined. During implementation, the processor 1 may perform comparison to determine a value relationship between the utility in each transaction with the specified utility threshold, to determine the target transaction in which the utility reaches the specified utility threshold.

Step S230: Determine a period value (i.e., a target period value) of the candidate pattern (i.e., a target candidate pattern corresponding to the target transaction) according to a time attribute (i.e., a target time attribute) of each target transaction.

Each transaction in the transactional database has a time attribute. During an abstractive analysis, a time length of the transactional database may be defined as a quantity of the transactions included in the transactional database, and a time difference between every two adjacent transactions is the same. For example, the time difference between two adjacent transactions is denoted as 1. For example, if the database includes five transactions: A, B, C, D, and E, it may be determined that a length of the database is 5, a time difference between the transaction A and the transaction B is 1, and a time difference between the transaction A and the transaction D is 3.

That the period value of the candidate pattern is determined according to the time attribute of the target transaction is described by still using the foregoing example. Assuming that target transactions corresponding to a candidate pattern 1 include A, C, and E, a period value of the candidate pattern 1 is a largest one of differences between two adjacent target transactions in the three target transactions, where a time difference between A and C is 2, and a time difference between C and E is 2, that is, the period value of the candidate pattern 1 is 2.

During implementation on the server, the processor 1 may determine the period value of the candidate pattern according to the time attribute of each target transaction.

Step S240: Determine the candidate pattern as a mining result if the period value of the candidate pattern is less than or equal to a specified period threshold.

If a period value of a candidate pattern is less than or equal to the specified period threshold, it indicates that a period value condition defined by the user is satisfied, and the candidate pattern may be determined as the mining result. During implementation, the processor 1 may perform comparison to determine a value relationship between the period value of each candidate pattern and the specified period threshold, determine the candidate pattern whose period value is less than or equal to the specified period threshold as the mining result, and output and display the mining result by using a display screen 5.

According to the pattern mining method provided in this embodiment of this application, for an obtained candidate pattern set, utility of the candidate pattern set in each transaction is calculated; a transaction in which the utility is less than a specified utility threshold is deleted, where pattern utility for this part of transactions is excessively low, and after the deletion, a mining and calculation time can be reduced; a period value of a candidate pattern is determined according to a time attribute of a remaining target transaction after the deletion; and when the period value is less than or equal to a specified period threshold, the candidate pattern is determined as a mining result, to ensure that utility of a pattern obtained through mining is evenly distributed in time, so that it is more convenient for accurate decision-making.

An implementation process of step S230 is described below.

Figure 3:
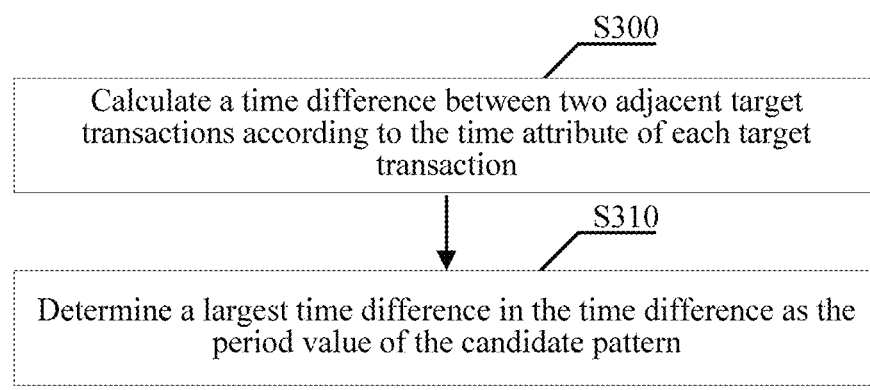
FIG. 3 is a flowchart of a method for determining a period value of a candidate pattern according to an embodiment.

FIG. 3 is a flowchart of a method for determining a period value of a candidate pattern according to an embodiment. As shown in FIG. 3, the method includes the following steps.

Step S300: Calculate a time difference between two adjacent target transactions according to the time attribute of each target transaction.

Each target transaction has a time attribute. The time difference between the two adjacent target transactions is calculated according to the time attribute of the target transaction, and a calculation process is: sorting the transactions in the database in chronological order; for target transactions sequentially sorted in the database, calculating, if no any other target transaction exists before the target transaction, a time difference between the target transaction and the first transaction in the database; calculating, if no any other target transaction exists after the target transaction, a time difference between the last transaction in the database and the target transaction; and calculating, if another target transaction exists before the target transaction, a time difference between the target transaction and a previous adjacent target transaction.

For ease of understanding, an example is used below for description.

Assuming that the transactional database includes five transactions: A, B, C, D, and E, and target transactions are the transactions B and C, for the target transaction B, because no other target transaction exists before the target transaction B, a time difference between the target transaction B and the first transaction A in the database is calculated and is 1; for the target transaction C, because no any other target transaction exists after the target transaction C, a time difference between the target transaction C and the last transaction E in the database is calculated and is 2; and for the target transaction C, because the target transaction B exists before the target transaction C, a time difference between the two target transactions is calculated and is 1.

Step S310: Determine a largest time difference in the time difference as the period value of the candidate pattern.

Still referring to the foregoing example for description, the time differences include 1, 2, 1, and the largest time difference is 2. Therefore, the period value of the candidate pattern is determined as 2.

For the period value of the candidate pattern, for transactions including the candidate pattern, after a transaction in which pattern utility is less than the specified utility threshold is deleted, a largest value in time differences between remaining transactions is used as the period value of the candidate pattern.

Figure 4:
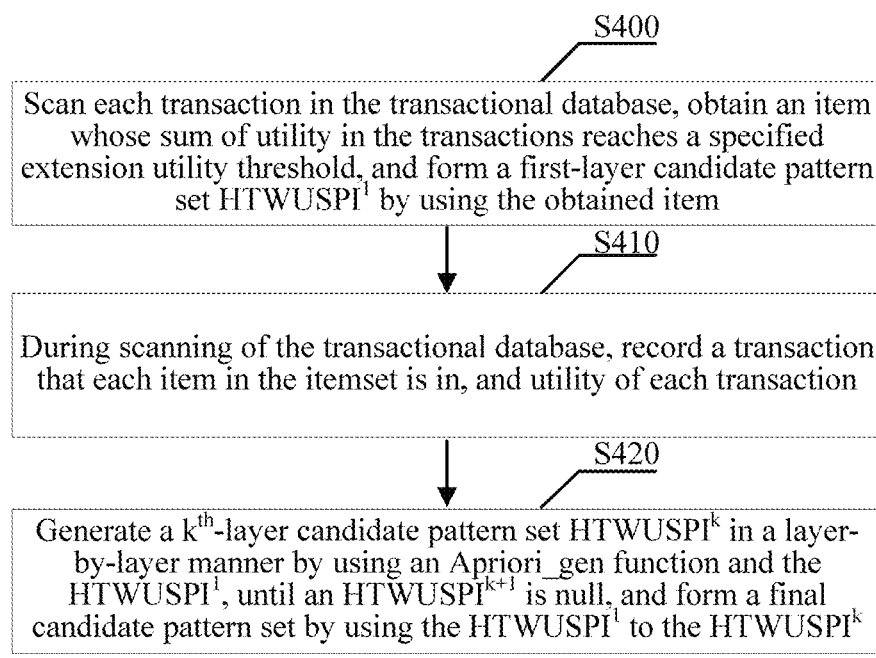
FIG. 4 is a flowchart of a method for obtaining a candidate pattern set according to an embodiment.

FIG. 4 is a flowchart of a method for obtaining a candidate pattern set according to an embodiment. Referring to FIG. 4, a process of step S200 is described, and the method includes the following steps.

Step S400: Scan each transaction in the database, obtain an item whose sum of utility in the transactions reaches a specified extension utility threshold, and form a first-layer candidate pattern set $HTWUSPI^1$ by using the obtained item.

The extension utility threshold is greater than or equal to the utility threshold. In an optional setting manner, a relationship between the extension utility threshold M and the utility threshold Y is: $M=Y*TU*1/T$, where TU is a sum of utility of all transactions in the transactional database, and T is the specified period threshold.

Step S410: During scanning of the transactional database, record a transaction that each item in the itemset is in, and utility of each transaction.

When step S400 is performed, the transaction that each item in the itemset is in, and the utility of each transaction are recorded. During an operation, a transaction identifier (TID) of a transaction that an item is in, and utility of a transaction corresponding to each TID may be recorded. The utility of the transaction is a sum of utility of items included in the transaction.

Step S420: Generate a kth-layer candidate pattern set $HTWUSPI^k$ in a layer-by-layer manner by using an Apriori_gen function and the $HTWUSPI^1$, until a (k+1)th-layer candidate pattern set $HTWUSPI^{k+1}$ is null, and form a final candidate pattern set by using the $HTWUSPI^1$ to the $HTWUSPI^k$.

The Apriori_gen function is a function provided by an Apriori algorithm, and a candidate pattern set can be generated in a layer-by-layer manner according to the function. When the kth-layer candidate pattern set $HTWUSPI^k$ is generated, the $HTWUSPI^k$ is generated by combining every two candidate patterns that are in a (k−1)th-layer candidate pattern set $HTWUSPI^{k-1}$ and that satisfy a condition.

Next, a process of generating the $HTWUSPI^k$ in step S420 is described.

Figure 5:
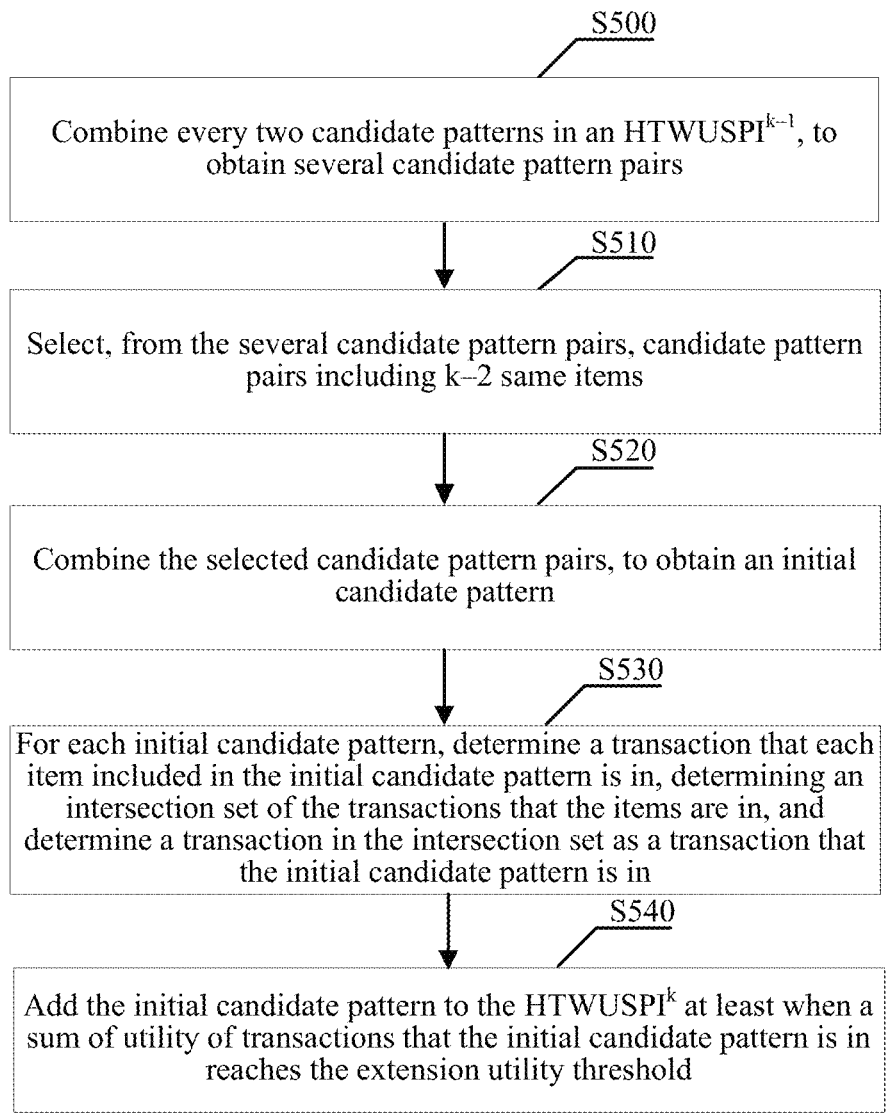
FIG. 5 is a flowchart of a method for generating a kth-layer candidate pattern set according to an embodiment.

FIG. 5 is a flowchart of a method for generating a kth-layer candidate pattern set according to an embodiment. Referring to FIG. 5, the process includes the following steps.

Step S500: Combine every two candidate patterns in an $HTWUSPI^{k-1}$, to obtain several candidate pattern pairs.

Step S510: Select, from the several candidate pattern pairs, candidate pattern pairs including k−2 same items.

If two candidate patterns in a candidate pattern pair include k−2 same items, the candidate pattern pair is selected.

Step S520: Combine the selected candidate pattern pairs, to obtain an initial candidate pattern.

An example is used for description. Assuming that k=4, two candidate patterns [a, b, c] and [a, b, d] exist in an $HTWUSPI^{4-1}$, and the two candidate patterns include 4-2 same items, the two candidate patterns are combined, and an initial candidate pattern: [a, b, c, d] is obtained after the combination.

Step S530: For each initial candidate pattern, determine a transaction that each item included in the initial candidate pattern is in, determine an intersection set of the transactions that the items are in, and determine a transaction in the intersection set as a transaction that the initial candidate pattern is in.

To determine the transaction that the initial candidate pattern is in, a transaction that each item included in the initial candidate pattern is in may be determined according to the transaction that each item in the itemset is in and that is recorded in step S410; the intersection set of the transactions that the items are in is determined; and the transaction in the intersection set is the transaction that the initial candidate pattern is in.

Step S540: Add the initial candidate pattern to the $HTWUSPI^k$ at least when a sum of utility of transactions that the initial candidate pattern is in reaches the extension utility threshold.

The sum of the utility of the transactions that the initial candidate pattern is in may be determined according to the utility of each transaction in the transactional database that is recorded in step S410; then, an initial candidate pattern at least satisfying that the sum reaches the extension utility threshold is determined; and the determined initial candidate pattern is added to the $HTWUSPI^k$.

Further, in this embodiment of this application, a pruning strategy is provided for the process of generating the $HTWUSPI^k$, to avoid generation of a candidate pattern whose period value does not satisfy the specified period threshold. For the process of generating the $HTWUSPI^k$ in combination with the pruning strategy, refer to FIG. 6.

Figure 6:
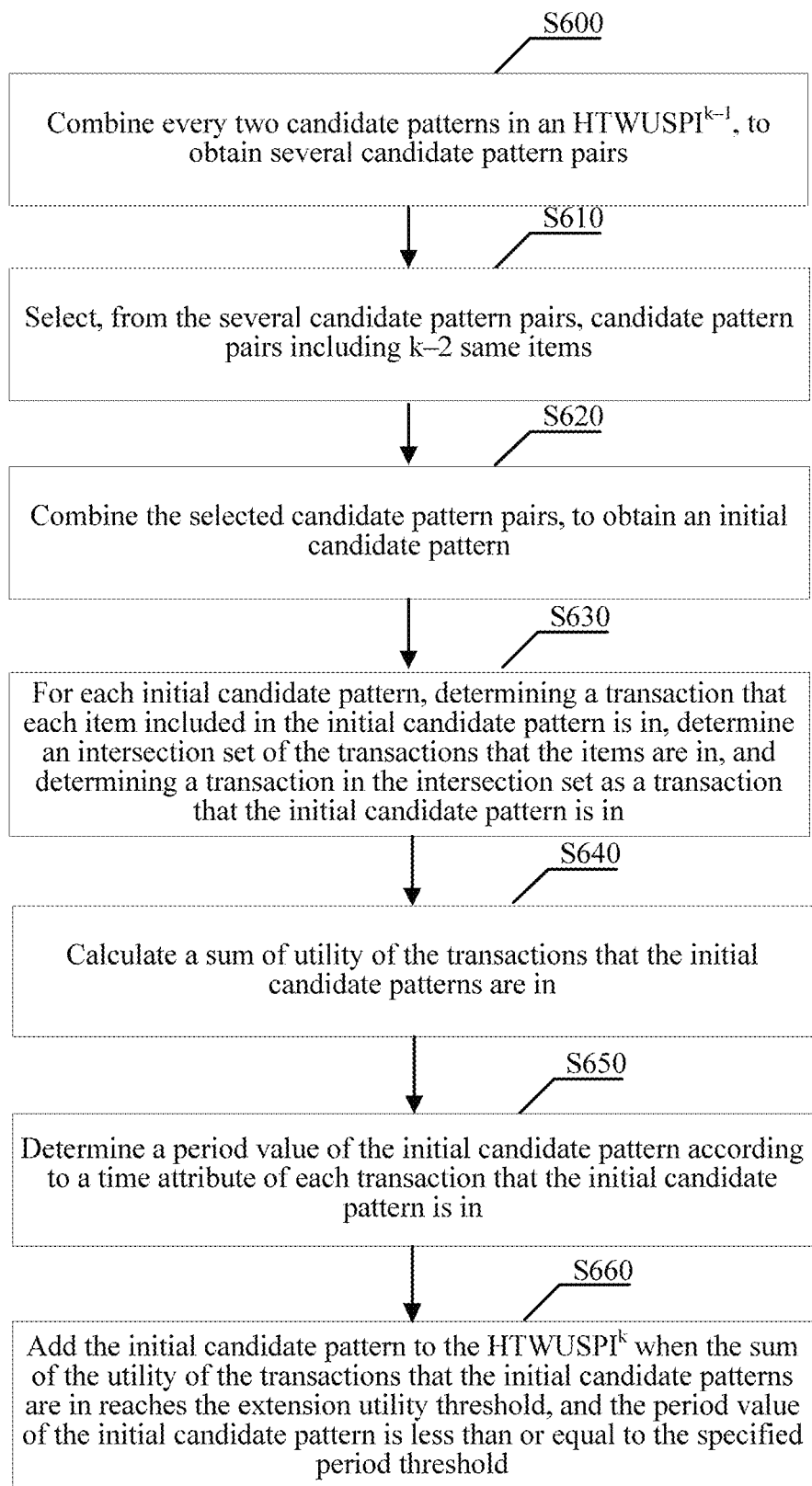
FIG. 6 is a flowchart of a method for generating a kth-layer candidate pattern set according to an embodiment.

FIG. 6 is a flowchart of a method for generating a kth-layer candidate pattern set according to an embodiment. Referring to FIG. 6, the process includes the following steps.

Step S600: Combine every two candidate patterns in an $HTWUSPI^{k-1}$, to obtain several candidate pattern pairs.

Step S610: Select, from the several candidate pattern pairs, candidate pattern pairs including k−2 same items.

If two candidate patterns in a candidate pattern pair include k−2 same items, the candidate pattern pair is selected.

Step S620: Combine the selected candidate pattern pairs, to obtain an initial candidate pattern.

Step S630: For each initial candidate pattern, determine a transaction that each item included in the initial candidate pattern is in, determine an intersection set of the transactions that the items are in, and determine a transaction in the intersection set as a transaction (i.e., an initial transaction) that the initial candidate pattern is in.

Step S640: Calculate a sum of utility of transactions that the initial candidate pattern is in.

The sum of the utility of the transactions that the initial candidate pattern is in may be determined according to the utility of each transaction in the database that is recorded in step S410.

Step S650: Determine a period value (i.e., an initial period value) of the initial candidate pattern according to a time attribute (i.e., an initial time attribute) of each transaction that the initial candidate pattern is in.

For each transaction that the initial candidate pattern is in, according to the time attribute of each transaction, a time difference between two adjacent transactions is calculated, a largest time difference in the calculated time differences is determined as the period value of the initial candidate pattern.

Step S660: Add the initial candidate pattern to the $HTWUSPI^k$ when the sum of the utility of the transactions that the initial candidate patterns are in reaches the extension utility threshold, and the period value of the initial candidate pattern is less than or equal to the specified period threshold.

Compared with the method in the previous embodiment, in this embodiment, when the $HTWUSPI^k$ is generated, determining of the period threshold is further added, and an initial candidate pattern whose period value does not reach the period threshold is filtered out, so that a quantity of times of scanning the database subsequently is reduced, and a pattern mining time is reduced.

Another pruning strategy is provided for a process of obtaining the candidate pattern set satisfying the specified condition, to avoid generation of a candidate pattern whose utility does not reach the specified utility threshold. The process of obtaining the candidate pattern set satisfying the specified condition in combination with the pruning strategy is described.

Figure 7:
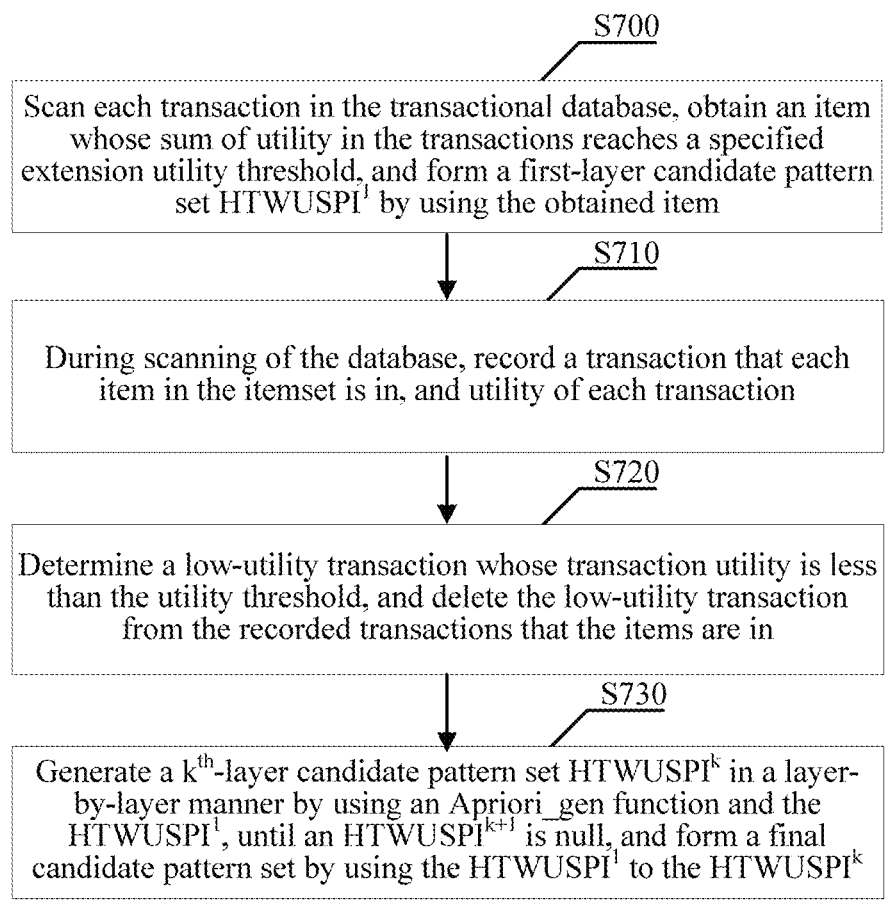
FIG. 7 is a flowchart of a method for obtaining a candidate pattern set according to an embodiment.

FIG. 7 is a flowchart of a method for obtaining a candidate pattern set according to an embodiment. Referring to FIG. 7, the process includes the following steps.

Step S700: Scan each transaction in the database, obtain an item whose sum of utility in the transactions reaches a specified extension utility threshold, and form a first-layer candidate pattern set $HTWUSPI^1$ by using the obtained item.

The extension utility threshold is greater than the utility threshold. In an optional setting manner, a relationship between the extension utility threshold M and the utility threshold Y is: $M=Y*TU*1/T$, where TU is a sum of utility of all transactions in the database, and T is the specified period threshold.

Step S710: During scanning of the transactional database, record a transaction that each item in the itemset is in, and utility of each transaction.

Step S720: Determine a low-utility transaction whose transaction utility is less than the utility threshold, and delete the low-utility transaction from the recorded transactions that the items are in.

Step S730: Generate a kth-layer candidate pattern set $HTWUSPI^k$ in a layer-by-layer manner by using an Apriori_gen function and the $HTWUSPI^1$, until an $HTWUSPI^{k+1}$ is null, and form a final candidate pattern set by using the $HTWUSPI^1$ to the $HTWUSPI^k$.

Compared with a process of obtaining a candidate pattern set in the example in FIG. 4, it may be learned that, in this implementation, a process of deleting a low-utility transaction is newly added, that is, the recorded transaction that each item in the itemset is in does not include a low-utility transaction, to avoid to some extent generation of a candidate pattern whose utility does not reaches the specified utility threshold, so that a quantity of times of scanning the database subsequently is reduced, and a pattern mining time is reduced.

To make this embodiment of this application clearer, the entire solution is described below by using a complete example. It is assumed that the database includes the following transactions: a transaction 1 (2a, b, c, d, 2f), a transaction 2 (a, c, d, 3e), a transaction 3 (a, d, f, h), and a transaction 4 (c, e, g, h), the user sets the utility threshold to Y, the extension utility threshold to M, and the period threshold to T.

A pattern mining process is as follows in S1-S7.

S1: Scan the database, to obtain an item who sum of utility in transactions reaches M, and form the first-layer candidate pattern set $HTWUSPI^1$ by using the obtained item.

Assuming that the $HTWUSPI^1$ satisfying the condition includes [a, b, c, d].

S2: Record a transaction that each item in the itemset is in, and utility of each transaction. For recorded information, refer to the following two tables.

TABLE 1

| Transaction that each item in an itemset is in | | | | | | | |
|---|---|---|---|---|---|---|---|
| Item | a | b | c | d | e | f | g | h |
| TID | 1, 2, 3 | 1 | 1, 2, 4 | 1, 2, 3 | 2, 4 | 1, 3 | 4 | 3, 4 |

TABLE 2

| Utility of each transaction | | | | |
|---|---|---|---|---|
| TID | 1 | 2 | 3 | 4 |
| Transaction utility | X1 | X2 | X3 | X4 |

S3: Determine a low-utility transaction whose transaction utility is less than the utility threshold, and delete the low-utility transaction from the recorded transactions that the items are in.

Assuming that utility X4 of the transaction 4 is less than utility threshold Y, Table 1 is modified, and the transaction 4 in Table 1 is deleted. Table 3 obtained after the modification is as follows:

TABLE 3

| Transaction that each item in an itemset is in after modification | | | | | | |
|---|---|---|---|---|---|---|
| Item | a | b | c | d | e | f | h |
| TID | 1, 2, 3 | 1 | 1, 2 | 1, 2, 3 | 2 | 1, 3 | 3 |

S4: Generate an $HTWUSPI^2$.

A generation process is as follows in S41-S43.

S41: Combine every two candidate patterns in the $HTWUSPI^1$ {[a], [b], [c], [d]}, and select a candidate pattern pair including 2-2 same items for combination, to obtain initial candidate patterns: [a, b], [a, c], [a, d], [b, c], [b, d], and [c, d].

S42: For each initial candidate pattern, determine a transaction that each item included in the initial candidate pattern is in, determine an intersection set of the transactions that the items are in, and determine a transaction in the intersection set as a transaction that the initial candidate pattern is in.

Determined transactions that each initial candidate pattern is in are as follows:

a transaction that [a, b] is in includes the transaction 1;

transactions that [a, c] is in include the transaction 1 and the transaction 2;

. . .

transactions that [c, d] is in include the transaction 1 and the transaction 2.

S43: Add the initial candidate pattern to the $HTWUSPI^2$ when the sum of the utility of the transactions that the initial candidate pattern is in reaches the extension utility threshold, and the period value of the initial candidate pattern is less than or equal to the specified period threshold.

For ease of more clear description, herein, only the initial candidate pattern [a, c] is used as an example for description.

A sum of utility of the transactions that [a, c] is in is X1+X2, and a period value of [a, c] is calculated as follows:

The database includes the transactions 1 to 4, and the transactions that [a, c] is in are the transaction 1 and the transaction 2. Therefore, according to a difference calculation manner disclosed in this application, the following several time differences are obtained: 1-1, 2-1, and 4-2, and a largest time difference 4-2=2 is selected therefrom as the period value of [a, c].

It is determined whether X1+X2 is greater than M, and whether 2 is less than or equal to T; and if yes, [a, c] is added to the $HTWUSPI^2$.

S5: Generate an $HTWUSPI^3$.

For a generation process, refer to a process of generating the $HTWUSPI^2$. Details are not described herein again.

Assuming that a generated $HTWUSPI^4$ is null, that is, the $HTWUSPI^4$ does not exist.

The generated the $HTWUSPI^1$ to the $HTWUSPI^3$ are used as candidate pattern sets.

It is assumed that the $HTWUSPI^1$ includes {[a], [b], [c], [d]}; the $HTWUSPI^2$ includes {[a, b], [a, c], [a, d]}; and the $HTWUSPI^3$ includes {[a, c, d]}.

S6: For each candidate pattern, calculate utility of the candidate pattern in each transaction, determine a target transaction in which the utility reaches Y, and determine a period value of the candidate pattern according to a time attribute of each target transaction.

For ease of more clear description, herein, only the candidate pattern [a, c, d] is used as an example for description.

Utility of [a, c, d] in the transaction 1 is X11, and utility of [a, c, d] in the transaction 2 is X21. If it is determined that X11 and X21 are both greater than or equal to Y, the transaction 1 and the transaction 2 are determined as target transactions. For a process of determining a period value of [a, c, d] according to time attributes of the target transactions, refer to the related descriptions above, and the period value is 2.

S7: Determine the candidate pattern as a mining result if the period value of the candidate pattern is less than or equal to T.

Assuming that the period value 2 of [a, c, d] is less than or equal to T, [a, c, d] may be used as a result obtained through mining.

The pattern mining method provided in the embodiments of this application is explained and described above, and a pattern mining apparatus provided in an embodiment of this application is explained and described below. Cross-reference may be correspondingly made to the pattern mining apparatus described below and the pattern mining method described above.

Figure 8:
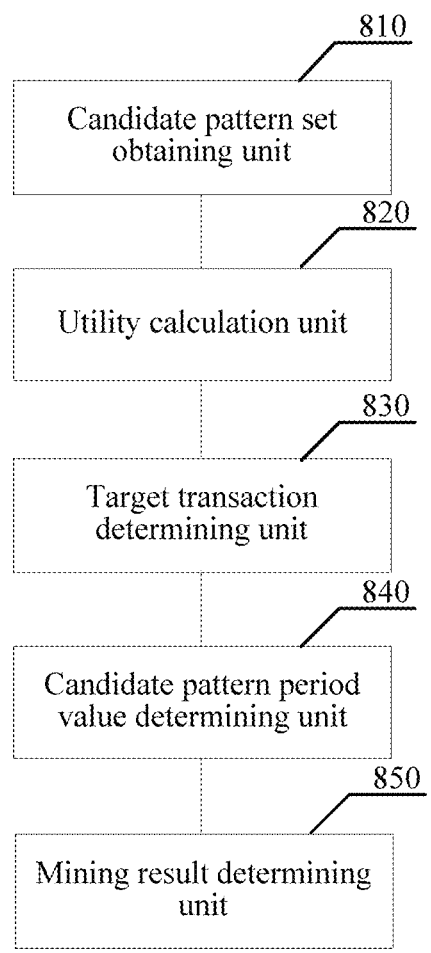
FIG. 8 is a schematic structural diagram of a pattern mining apparatus according to an embodiment.

FIG. 8 is a schematic structural diagram of a pattern mining apparatus according to an embodiment. As shown in FIG. 8, the apparatus includes:

a candidate pattern set obtaining unit 810, configured to obtain, according to each transaction included in a database, a candidate pattern set satisfying a specified condition, each transaction including at least one item; each candidate pattern in the candidate pattern set including an item in at least one itemset; and the itemset being a set generated according to the item in each transaction;

a utility calculation unit 820, configured to, for each candidate pattern in the candidate pattern set, calculate utility of the candidate pattern in each transaction;

a target transaction determining unit 830, configured to determine a target transaction in which the utility reaches a specified utility threshold;

a candidate pattern period value determining unit 840, configured to determine a period value of the candidate pattern according to a time attribute of each target transaction; and a mining result determining unit 850, configured to determine the candidate pattern as a mining result if the period value of the candidate pattern is less than or equal to a specified period threshold.

Optionally, the candidate pattern period value determining unit 840 may include:

a time difference calculation unit, configured to calculate a time difference between two adjacent target transactions according to the time attribute of each target transaction; and a largest time difference selection unit, configured to determine a largest time difference in the time difference as the period value of the candidate pattern.

Optionally, the time difference calculation unit may include:

a first time difference calculation subunit, configured to for target transactions sequentially sorted in the database, calculate, if no any other target transaction exists before the target transaction, a time difference between the target transaction and the first transaction in the database;

a second time difference calculation subunit, configured to calculate, if no any other target transaction exists after the target transaction, a time difference between the last transaction in the database and the target transaction; and a third time difference calculation subunit, configured to calculate, if another target transaction exists before the target transaction, a time difference between the target transaction and a previous adjacent target transaction.

Optionally, the candidate pattern set obtaining unit 810 may include:

a first-layer candidate pattern set obtaining unit, configured to: scan each transaction in the database, obtain an item whose sum of utility in the transactions reaches a specified extension utility threshold, and form a first-layer candidate pattern set $HTWUSPI^1$ by using the obtained item, where the extension utility threshold is greater than or equal to the utility threshold;

a transaction recording unit, configured to, during scanning of the database, record a transaction that each item in the itemset is in, and utility of each transaction; and a kth-layer candidate pattern set generation unit, configured to: generate a kth-layer candidate pattern set $HTWUSPI^k$ in a layer-by-layer manner by using an Apriori_gen function and the $HTWUSPI^1$, until an $HTWUSPI^{k+1}$ is null, and form a final candidate pattern set by using the $HTWUSPI^1$ to the $HTWUSPI^k$.

The kth-layer candidate pattern set generation unit may include:

a unit for combining every two candidate patterns, configured to combine every two candidate patterns in an $HTWUSPI^{k-1}$, to obtain several candidate pattern pairs;

a candidate pattern pair selection unit, configured to select, from the several candidate pattern pairs, candidate pattern pairs including k−2 same items;

a candidate pattern pair combination unit, configured to combine the selected candidate pattern pairs, to obtain an initial candidate pattern;

a unit for determining a transaction that an initial candidate pattern is in, configured to: for each initial candidate pattern, determine a transaction that each item included in the initial candidate pattern is in, determine an intersection set of the transactions that the items are in, and determine a transaction in the intersection set as a transaction that the initial candidate pattern is in; and a unit for adding an initial candidate pattern to a set, configured to add the initial candidate pattern to the $HTWUSPI^k$ at least when a sum of utility of transactions that the initial candidate pattern is in reaches the extension utility threshold.

The unit for adding an initial candidate pattern to a set may include:

a first subunit for adding an initial candidate pattern to a set, configured to calculate the sum of the utility of the transactions that the initial candidate pattern is in;

a second subunit for adding an initial candidate pattern to a set, configured to determine a period value of the initial candidate pattern according to a time attribute of each transaction that the initial candidate pattern is in; and a third subunit for adding an initial candidate pattern to a set, configured to add the initial candidate pattern to the $HTWUSPI^k$ when the sum of the utility of the transactions that the initial candidate patterns are in reaches the extension utility threshold, and the period value of the initial candidate pattern is less than or equal to the specified period threshold.

Optionally, the candidate pattern set obtaining unit 810 may further include:

a low-utility transaction deletion unit, configured to: after the transaction recording unit, determine a low-utility transaction whose transaction utility is less than the utility threshold, and delete the low-utility transaction from the transactions that the items are in and that are recorded by the transaction recording unit.

An embodiment of this application further provides a pattern mining device. The device includes a processor and a memory, the memory being configured to store a computer program, and the processor being configured to read the computer program, to execute an executable instruction, the executable instruction being used to implement the pattern mining method. An embodiment of this application further provides a storage medium, the storage medium being configured to store program code, and the program code being used to perform the pattern mining method.

An embodiment of this application further provides a computer program product including instructions, when run in a computer, the instructions causing the computer to perform the pattern mining method.

The pattern mining method and apparatus provided above in this application are explained and described.

An HUIM method and a related device provided below in this application are separately explained and described.

An HUIM technology is described first. The HUIM is a utility based itemset mining technology, in which external utility (for example, a profit) and intrinsic utility (for example, a quantity of occurrence times in a transaction, which may be a quantity of trades or the like in a trade scenario) corresponding to an itemset are measured, to calculate itemset utility of the itemset in a database; and when the itemset utility of the itemset is greater than or equal to an MMU threshold self-defined by a user, it is considered that the itemset is an HUI.

An HUIM method is setting a unique and fixed MMU threshold as an HUI measurement criterion for implementation, that is, after itemset utility of each itemset is calculated, comparing the itemset utility of each itemset with the unique and fixed MMU threshold, and using an itemset whose itemset utility is greater than or equal to the unique and fixed MMU threshold, as an HUI.

However, in most cases, one itemset includes one or more data items, and different data items may correspond to different MMU thresholds. Consequently, different itemsets possibly correspond to different MMU thresholds. An embodiment of this application provides an HUIM manner, to resolve a problem of inaccurate HUIM, and improve accuracy of an HUI obtained through mining.

For ease of understanding of the technical solutions described in the embodiments of this application, names and concepts in the embodiments of this application are described below first.

1. A transaction is a record in a transactional database, for example, a record in a transactional database of a trade type is a trade record of a commodity, and each transaction in the transactional database may correspond to one commodity trade record.

2. TIDs are numbers of different transactions in a transactional database, and the transactions are numbered in a chronological order.

3. A data item is an information item recorded in a transaction. One transaction includes at least one data item. For example, in a transactional database of a trade type, each transaction includes a data item of a traded commodity, and intrinsic utility (for example, a quantity of trades) of each commodity. The quantity of trades is a presentation form of the intrinsic utility in a trade scenario, and in a transactional database in another scenario, a form of the intrinsic utility may be correspondingly adjusted.

As shown in the following Table 4, a transactional database of a trade type includes 10 transactions, each transaction indicates one trade record, and each transaction includes a data item of a name of each traded commodity, and a quantity of trades (a form of intrinsic utility) of each commodity in the transaction.

TABLE 4

Transaction in a database of a trade type

| TID | Transaction (commodity name: quantity of trades) |
|---|---|
| T1 | A:1, C:2, D:3 |
| T2 | A:2, D:1, E:2 |
| T3 | B:3, C:5 |
| T4 | A:1, C:3, D:1, E:2 |
| T5 | B:1, D:3, E:2 |
| T6 | B:2, D:2 |
| T7 | B:3, C:2, D:1, E:1 |
| T8 | A:2, C:3 |
| T9 | C:2, D:2, E:1 |
| T10 | A:2, C:2, D:1 |

It may be learned from Table 4 that, in the transactional database of the trade type, a data item in a transaction may be a commodity name, and intrinsic utility may be a quantity of trades of each commodity in the transaction. In Table 4, the transactional database includes five data items: A, B, C, D, and E, where a transaction T1 may be actually a trade record indicating that one commodity A, two commodities C, and three commodities D are bought; and a transaction T7 may be actually a shopping record indicating that three commodities B, two commodities C, one commodity D, and one commodity E are bought.

In the field of journalism, each transaction in Table 4 may include at least one piece of news, and a value of interest, a value of sensitivity, a value of freshness, and the like of each piece of news may be recorded in each transaction. In the field of stocks and the like, each transaction in Table 4 may include at least one stock, and a risk, a profit, and the like of each stock may be recorded in each transaction.

4. An itemset is a set formed by at least one data item, and is used to represent an inherent association rule of a transactional database; and a difference between a transaction and an itemset lies in that, the transaction may be a record that is triggered by an actual event to be generated in the transactional database, but the itemset may be obtained through mining from a database, and does not necessarily has actual meanings.

5. A k-itemset is a set including k data items. For example, a 1-itemset may be an itemset including one data item, for example, an itemset A including only a data item A; a 2-itemset may be an itemset including two data items, for example, an itemset AB including data items A and B. The rest may be deduced by analogy.

6. An external utility table (for example, a profit table) is a table in which unit external utility corresponding to each data item in a transactional database is recorded. In a transactional database of a trade type, a profit table may be a presentation form of an external utility table, that is, a unit profit of each data item in the transactional database may be recorded in the external utility table. Refer to a profit table shown in Table 5.

TABLE 5

| Profit table | | | | | |
| --- | --- | --- | --- | --- | --- |
| Data item | A | B | C | D | E |
| Unit profit | 6 | 12 | 1 | 9 | 3 |

It may be learned from Table 5 that, the profit table indicates a unit profit that can be gained when one commodity is sold. For example, a profit of six yuan can be gained when one commodity A is sold; a profit of 12 yuan can be gained when one commodity B is sold. It may be learned that, the external utility table may indicate unit external utility corresponding to each data item.

7. Utility of a data item in a transaction (Utility of an item in a transaction) is utility of one data item in a transaction, and may be intrinsic utility of a data item in a transaction multiplied by unit external utility of the data item. For example, in a transactional database of a trade type, utility of a data item in a transaction may be a quantity of trades of the data item in the transaction multiplied by a unit profit of the data item. As shown in Table 4 and Table 5, utility of a data item B in a transaction T3 may be 3×12=36.

8. Utility of an itemset in a transaction is a sum of utility of data items in an itemset in a transaction. As shown in Table 4 and Table 5, utility of an itemset BC (an itemset including only data items B and C) in a transaction T3 is 3×12+5×1=41.

9. Itemset utility (Itemset utility in Database) is utility of an itemset in a transactional database, that is, a sum of utility of the itemset in transactions including all data items in the itemset.

10. An MMU threshold table is defined in the embodiments of this application, and is a table indicating an MMU threshold corresponding to each data item.

Refer to a form of an MMU table shown in Table 6. An MMU threshold of each data item defined in the MMU threshold table is not fixed, but may be set by a user according to an actual situation of each data item, for example, an MMU threshold of each commodity may be updated according to a fluctuation in price of the commodity.

TABLE 6

| MMU threshold table | | | | | |
| --- | --- | --- | --- | --- | --- |
| Data item | A | B | C | D | E |
| MMU threshold | 56 | 65 | 53 | 50 | 70 |

11. An MIU threshold: In the embodiments of this application, because different data items possibly correspond to different MMU thresholds (as shown in Table 6), different itemsets also possibly correspond to different MMU thresholds. Therefore, to resolve a problem of relatively low accuracy that is caused because a unique and fixed MMU threshold is set for different itemsets in the existing technology, in the embodiments of this application, for each itemset, a suitable MIU threshold matching the itemset may be set according to a data item included in the itemset.

For each itemset, in the embodiments of this application, a data item with a lowest MMU threshold in the itemset may be determined, and the MMU threshold of the determined data item is used as an MIU threshold of the itemset, to obtain an MIU threshold corresponding to each itemset, to provide a basis for subsequent HUIM with relatively high accuracy.

Using an example in which an MIU threshold of an itemset AB is determined, the itemset AB includes a data item A and a data item B, and it may be learned from the MMU table that is set in Table 6 that, an MMU threshold of the data item A is the lowest, and therefore, the MMU threshold of the data item A may be used as the MIU threshold of the itemset AB, that is, the MIU threshold of the itemset AB is 56. For another example, an MIU threshold of an itemset BC is an MMU threshold of a data item C, that is, 53.

12. Transaction utility: Utility of a transaction is a sum of utility of data items forming the transaction in the transaction. As shown in Table 4, a transaction T5 includes data items B, D, and E, and in the embodiments of this application, utility of the transaction T5 may be determined as 1×12+3×9+2×3=45.

13. Total utility of a database is a sum of utility of transactions in the database. As shown in Table 4, total utility of the database is a sum of utility of transactions T1 to T10, that is, 35+27+41+24+45+42+50+15+23+23=325.

14. An LMU threshold is an LMU threshold in an MMU table. Using content in Table 6 as an example, the LMU threshold is an MMU threshold of a data item D, that is, 50.

15. An HUI: When itemset utility of an itemset≥an MIU threshold of the itemset, the itemset is an HUI. For example, itemset utility of an itemset A is 48 and is less than an MIU threshold of the itemset A, that is, 56, and then the itemset A is not an HUI. For another example, itemset utility of an itemset AD is 90, and is greater than an MIU threshold of the itemset AD, that is, 50, and then the itemset AD is an HUI.

16. TWU of an itemset is a sum of utility of transactions including a specified itemset. Using what are shown in Table 4 and Table 5 as an example, when a specified itemset is B (an itemset including only a data item B), transactions including the itemset B are T3, T5, T6, and T7, a sum of utility of the corresponding transactions T3, T5, T6, and T7 is 41+45+42+50=178, and TWU of the itemset B is 178.

17. A high transaction weighted utility itemset (HTWUI): When TWU of an itemset ≥an MIU threshold of the itemset, the itemset is an HTWUI. For example, TWU of an itemset B is 178, an MMU threshold of the itemset B is 65, and TWU of the itemset B is greater than the MMU threshold, so that it is determined that the itemset B is an HTWUI.

An HUIM method provided in an embodiment of this application is described below. The method may be applied to a data processing device having a data processing capability, for example, applied to a data processing server on a network side. HUIM may be performed on a device such as a computer on a user side according to different data mining scenarios.

Figure 9:
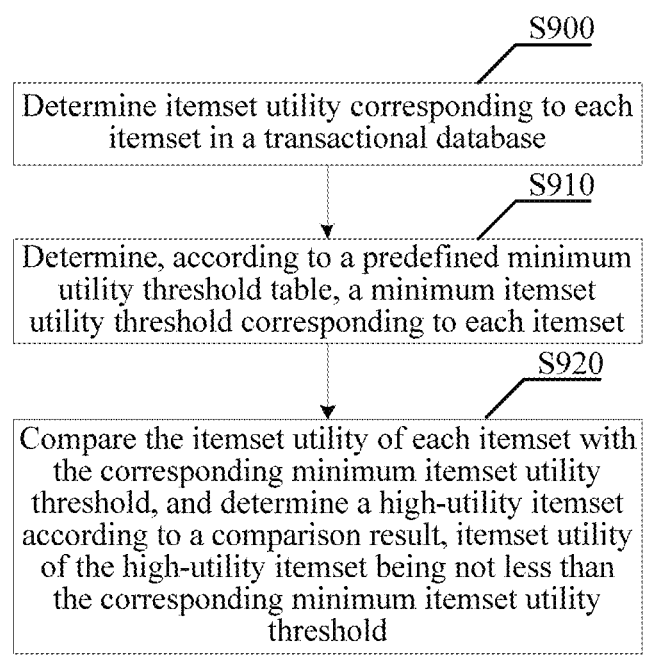
FIG. 9 is a flowchart of an HUIM method according to an embodiment.

FIG. 9 is a flowchart of an HUIM method according to an embodiment. As shown in FIG. 9, the method includes the following steps.

Step S900: Determine itemset utility corresponding to each itemset in a transactional database.

Optionally, itemset utility corresponding to one itemset indicates a sum of utility of the itemset in target transactions corresponding to the itemset, and a target transaction corresponding to one itemset is a transaction including all data items in the itemset. Utility of one itemset in a target transaction indicates a sum of utility of data items in the itemset in the target transaction.

Optionally, the transactional database may include at least one transaction; at least one data item and intrinsic utility corresponding to each data item may be recorded in a transaction; and one itemset may include at least one data item.

Optionally, utility of one data item in a transaction indicates a product of intrinsic utility of the data item in the transaction and unit external utility corresponding to the data item; external utility corresponding to each data item may be determined according to a predefined external utility table; and unit external utility corresponding to each data item is recorded in the external utility table.

For example, in a database of a trade type, in this embodiment of this application, a profit table (the profit table is a form of an external utility table) may be preset.

A unit profit of each commodity (a commodity is a form of a data item, and a unit profit is a form of unit external utility) is recorded by using the profit table. That is, utility of one commodity in a trade transaction is a product of a quantity of trades of the commodity in the trade transaction (the quantity of trades is a form of intrinsic utility) and a unit profit of the commodity.

Step S910: Determine, according to a predefined MMU threshold table, an MIU threshold corresponding to each itemset.

An MMU threshold corresponding to each data item is recorded in the predefined MMU threshold table. An MIU threshold corresponding to one itemset indicates an LMU threshold in MMU thresholds corresponding to data items included in the itemset.

Step S920: Compare the itemset utility of each itemset with the corresponding MIU threshold, and determine an HUI according to a comparison result, itemset utility of the HUI being not less than the corresponding MIU threshold.

In this embodiment of this application, an MMU threshold table in which MMU thresholds corresponding to data items are recorded is defined; when an MIU threshold corresponding to each itemset is determined, MMU thresholds corresponding to data items included in the itemset are compared with each other, to use an LMU threshold in the MMU thresholds corresponding to the data items included in the itemset, as an MIU threshold corresponding to the itemset, so that the determined MIU threshold corresponding to each itemset is closer to MMU of the itemset; and based on the determined MIU threshold of each itemset, itemset utility of each itemset is compared with the corresponding MIU threshold, to determine an HUI whose itemset utility is not less than the corresponding MIU threshold, thereby implementing HUIM.

According to the HUIM method provided in this embodiment of this application, an LMU threshold corresponding to a data item included in each itemset is used as an MIU threshold of each itemset, instead of using a unique and fixed MMU threshold as a mining criterion for an HUI, so that the determined MIU threshold corresponding to each itemset is closer to MMU of the itemset, and further, itemset utility of each itemset is compared with an MIU threshold corresponding to the itemset, to implement HUIM, so that a result obtained through mining is more accurate. This embodiment of this application improves accuracy of HUIM.

Based on what are shown in Table 4, Table 5, and Table 6, the following Table 7 shows a schematic diagram of an HUI whose itemset utility is not less than an MIU threshold, as shown in the following table 7:

TABLE 7

| HUI whose itemset utility is not less than an MIU threshold | | |
|---|---|---|
| Itemset | MIU threshold | Itemset utility |
| (B) | 65 | 108 |
| (D) | 50 | 126 |
| (AD) | 50 | 90 |
| (BC) | 53 | 79 |
| (BD) | 50 | 126 |
| (CD) | 50 | 83 |
| (DE) | 50 | 96 |
| (ACD) | 50 | 76 |
| (BDE) | 50 | 93 |
| (CDE) | 50 | 55 |
| (BCDE) | 50 | 50 |

Optionally, a manner, provided in this embodiment of this application, for determining the itemset utility corresponding to each itemset in the transactional database may be: for each itemset, first determining at least one target transaction that is in the transactional database and that includes all data items in the itemset; determining utility of all the data items in the itemset in each determined target transaction; and obtaining a sum of the determined utility, to obtain the itemset utility of the itemset.

As shown in Table 4 and Table 5, itemset utility of an itemset B (an itemset including only a data item B) is $3\times12+1\times12+2\times12+3\times12=108$. In this embodiment of this application, transactions T3, T5, T6, and T7 including the data item B may be determined, to determine utility of the itemset B in the transaction T3 as $3\times12$, determine utility of the itemset B in the transaction T5 as $1\times12$, determine utility of the itemset B in the transaction T6 as $2\times12$, and determine utility of the itemset B in the transaction T7 as 3×12; and a sum of the determined utility is obtained, to obtain the itemset utility being 108.

Itemset utility of an itemset BC (an itemset including only data items B and C) is (3×12+5×1)+(3×12+2×1)=79. In this embodiment of this application, transactions T3 and T7 including the data items B and C may be determined; utility of the itemset BC in the transaction T3 is determined as 3×12+5×1, and utility of the itemset BC in the transaction T7 is determined as 3×12+2×1; and a sum of the determined utility is obtained, to obtain the itemset utility being 79.

Figure 10:
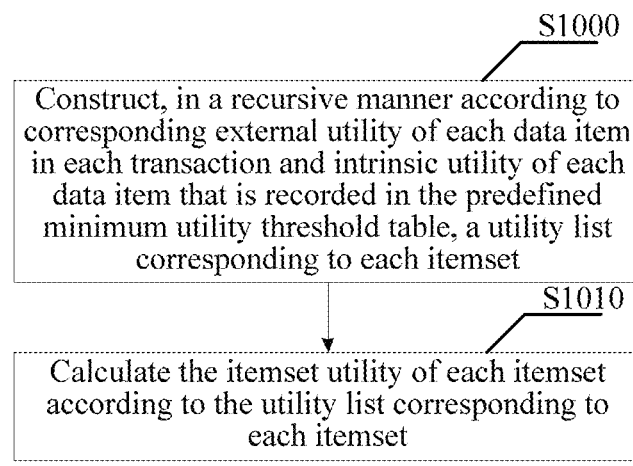
FIG. 10 is a flowchart of a method for determining itemset utility corresponding to an itemset according to an embodiment.

FIG. 10 is a flowchart of a method for determining itemset utility corresponding to an itemset according to an embodiment. Optionally, referring to FIG. 10, a process, provided in this embodiment of this application, of determining the itemset utility corresponding to each itemset in the transactional database may include the following steps.

Step S1000: Construct, in a recursive manner according to corresponding external utility of each data item in each transaction and intrinsic utility of each data item that is recorded in the predefined MMU threshold table, a utility list corresponding to each itemset.

A utility list corresponding to one itemset indicates a series of tuple information of the itemset in a transaction (that is, a target transaction of the itemset) appearing in the database. A utility list corresponding to one itemset may record a TID of each target transaction corresponding to the itemset, corresponding utility of the itemset in each target transaction, and remaining utility (RU) of the itemset in each target transaction. RU of one itemset in a transaction indicates a sum of utility of data items ranked on the right of the transaction that is obtained after data items in the transaction are sorted in ascending order of MMU thresholds, and a data item included in the itemset is removed from the transaction.

Step S1010: Calculate the itemset utility of each itemset according to the utility list corresponding to each itemset.

After the utility list corresponding to each itemset is constructed, the itemset utility of each itemset may be calculated according to the utility list corresponding to each itemset. Because the corresponding utility of each itemset in each target transaction is recorded in the utility list corresponding to each itemset, a sum of the corresponding utility of each itemset in the target transactions may be used as itemset utility of each itemset.

In the method shown in FIG. 10, when the itemset utility corresponding to each itemset is determined, how to construct, in a recursive manner, the utility list corresponding to each itemset is a key point. In this embodiment of this application, the utility list corresponding to each itemset may be constructed in a layered manner and in a recursive manner, where a layer ordinal number of one itemset corresponds to a quantity of data items included in the itemset, that is, each itemset at the first layer includes only one data item, each itemset at the second layer includes only two data items, and the rest may be deduced by analogy; and a utility list corresponding to a next-layer itemset may be constructed by using utility lists of at least two high-layer itemsets that can be combined into the itemset.

Optionally, when the utility list corresponding to each itemset is constructed in a layered manner and in a recursive manner, an enumeration MIU tree may be constructed first. The enumeration MIU tree may be considered as an extension version of a common enumeration tree. The MIU tree includes layered itemsets; a layer ordinal number of one itemset in the MIU tree corresponds to a quantity of data items included in the itemset; and itemsets at layers are sorted in ascending order of MMU thresholds.

Optionally, after the MIU tree is constructed, a utility list corresponding to each itemset combined with the MIU tree may be constructed based on the corresponding external utility of each data item in each transaction and the intrinsic utility of each data item; and a utility list corresponding to a next-layer itemset may be constructed by using utility lists of at least two high-layer itemsets that can be combined into the itemset.

When the MIU tree is constructed, each itemset that is in the transactional database and that includes one data item may be determined first, and the determined itemsets are sorted at the first layer of the MIU tree, to construct itemsets located at the first layer of the MIU tree; and then, layered itemsets are constructed by a depth-first search, and sequentially starting from the itemsets at the first layer of the MIU tree, and a layer ordinal number of one itemset in the MIU tree is made to correspond to a quantity of data items included in the itemset, to form the MIU tree.

Optionally, at one layer of the MIU tree, itemsets may be randomly sorted or sorted in ascending order of MMU thresholds.

Figure 11:
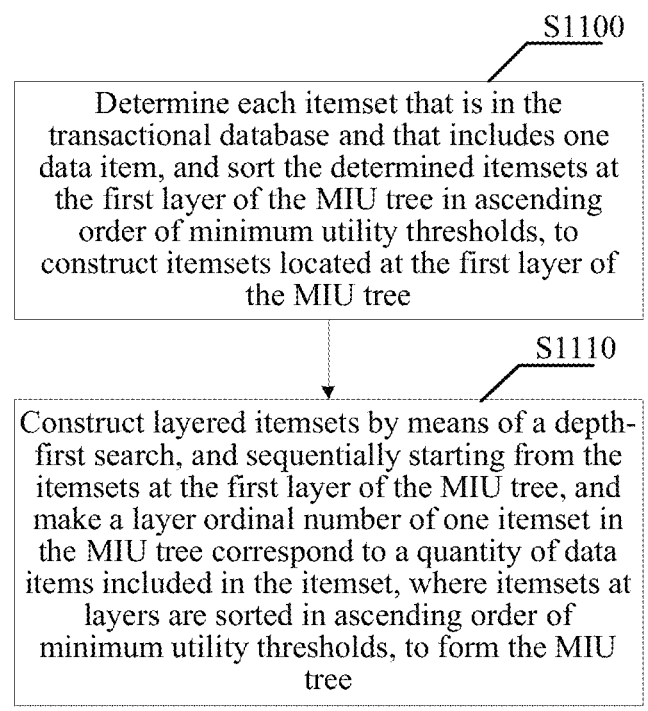
FIG. 11 is a flowchart of a method for constructing an MIU tree according to an embodiment.

FIG. 11 is a flowchart of a method for constructing an MIU tree according to an embodiment. Optionally, referring to FIG. 11, the method may include the following steps:

Step S1100: Determine each itemset that is in the transactional database and that includes one data item, and sort the determined itemsets at the first layer of the MIU tree in ascending order of MMU thresholds, to construct itemsets located at the first layer of the MIU tree.

When the MIU tree is constructed, each itemset that is in the transactional database and that includes one data item, that is, each 1-itemset, may be determined first, and the determined itemsets are sorted at the first layer of the MIU tree in ascending order of the MMU thresholds, to construct the itemsets located at the first layer of the MIU tree.

Step S1110: Construct layered itemsets by a depth-first search, and sequentially starting from the itemsets at the first layer of the MIU tree, and make a layer ordinal number of one itemset in the MIU tree correspond to a quantity of data items included in the itemset, where itemsets at layers are sorted in ascending order of MMU thresholds, to form the MIU tree.

After the itemsets located at the first layer of the MIU tree are constructed, the layered itemsets of the MIU tree may be constructed by the depth-first search.

Figure 12:
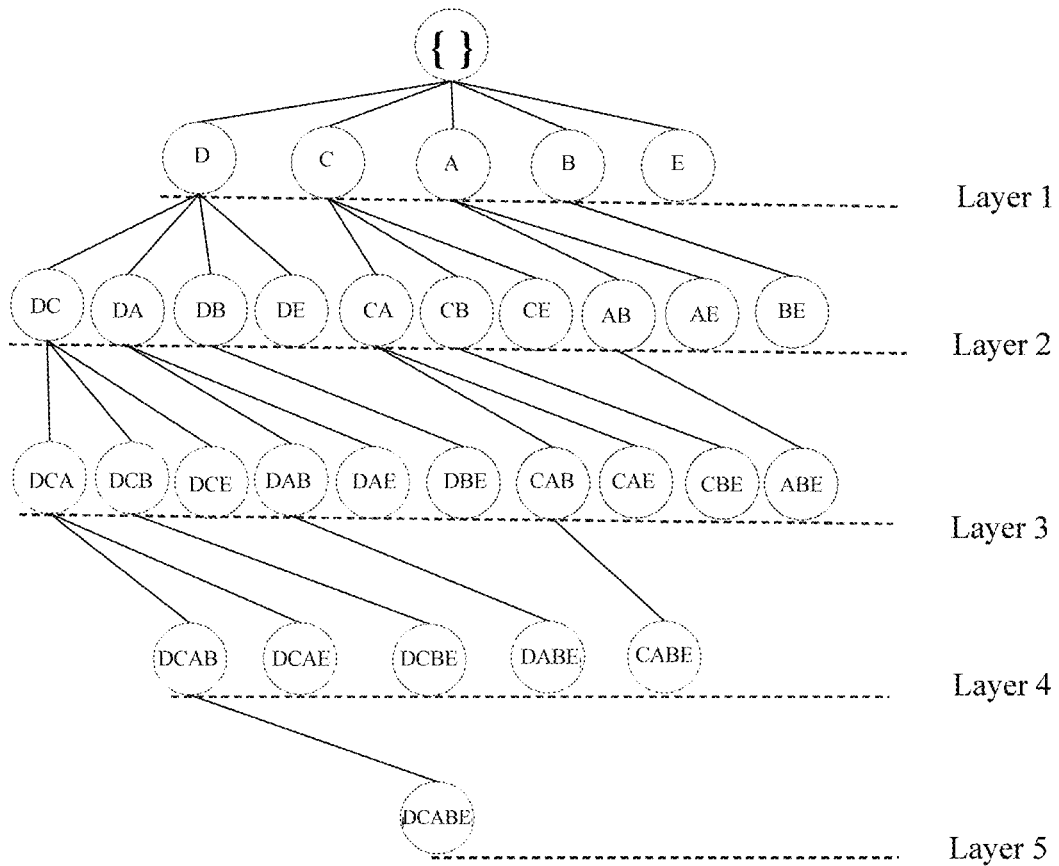
FIG. 12 is a schematic structural diagram of an MIU tree.

FIG. 12 is a schematic structural diagram of an MIU tree. With reference to FIG. 12, itemsets A, B, C, D, and E that are in the transactional database and that each include one data item may be determined first. With reference to what is shown in Table 6, a result obtained by sorting the itemsets A, B, C, D, and E in ascending order of MMU thresholds is: the itemsets D, C, A, B, and E, to sequentially sort D, C, A, B, and E at the first layer of the MIU tree. After the itemsets at the first layer of the MIU tree are constructed, starting from the itemset D, itemsets DC, DA, DB, and DE corresponding to the itemset D may be constructed at the second layer, the itemsets DC, DA, DB, and DE are sorted in ascending order of MMU thresholds, and then, itemsets DCA, DCB, DCE, DAB, and DAE corresponding to the itemset DC are constructed and sorted at the third layer. Next, an itemset DCABE corresponding to DCA is constructed at a next layer, and then, the process goes back to construction of a next-layer itemset corresponding to the itemset DA. The rest may be deduced by analogy. Therefore, the layered itemsets are constructed by sequentially starting from the itemsets at the first layer of the MIU tree.

Optionally, when the MIU tree is constructed, after a ranking of each itemset in each layer is determined, for each itemset at the first layer, utility of each itemset in each corresponding target transaction may be sequentially calculated, and RU of each itemset in each corresponding target transaction is determined. For example, in this embodiment of this application, a TID of each target transaction corresponding to the first itemset at the first layer, utility of the itemset in each corresponding target transaction, and RU of the itemset in each corresponding target transaction may be recorded first, and recorded by using a table. The itemsets at the first layer are sequentially processed, to obtain a utility list corresponding to each itemset at the first layer. With reference to Table 4, Table 5, and Table 6, FIG. 13 is provided below.

FIG. 13 is a schematic diagram of utility lists corresponding to itemsets at a first layer of an MIU tree. FIG. 13 provides the utility list corresponding to each itemset at the first layer of the MIU tree, where tid indicates a TID, iu indicates utility, and ru indicates RU.

After the utility list corresponding to each itemset at the first layer is determined, a utility list of a next-layer itemset in the MIU tree may be constructed by using utility lists of at least two high-layer itemsets that can be combined into the itemset.

Optionally, herein, the at least two high-layer itemsets that can be combined into the itemset may be at least two itemsets at a high layer that can be directly combined into the itemset, or may be at least two itemsets at a high layer that can be combined into the itemset after the at least two itemsets are combined and repeat data items are removed.

Figure 14:
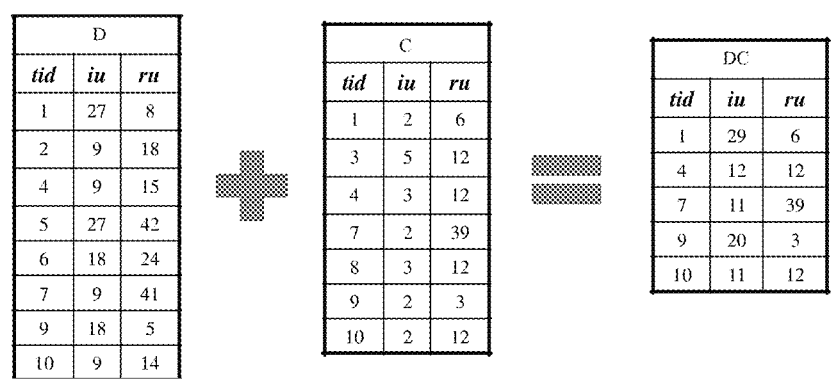
FIG. 14 is a schematic combination diagram of utility lists.

FIG. 14 is a schematic combination diagram of utility lists. For example, a utility list of the itemset DC at the second layer may be formed by combining utility lists of the itemsets D and C at the first layer, and a combination is shown in FIG. 14. TIDs of target transactions corresponding to the 2-itemset DC are TIDs of common target transactions of the 1-itemsets D and C, that is, {T1, T4, T7, T9, T10}. Utility of the itemset DC in T1 is equal to a sum of utility of the itemset D and the itemset C in the transaction T1, that is, 27+2=29, and processing for utility of the itemset DC in another target transaction is similar to this. RU of the itemset DC in each target transaction may be directly determined according to RU of the itemset C that is ranked behind in the itemsets D and C in each target transaction.

After the utility list of each itemset at the first layer is constructed, when a utility list of each itemset at the second layer is constructed, for each itemset at the second layer, two itemsets that are at the first layer and that can be combined into the itemset at the second layer may be determined; a same target transaction corresponding to the two itemsets is used as a target transaction corresponding to the itemset at the second layer; a sum of utility of the two itemsets in one same corresponding target transaction as utility of the itemset at the second layer in the target transaction; and RU of an itemset that is ranked behind in the two itemsets in one same corresponding target transaction is used as RU of the itemset at the second layer in the target transaction, to obtain the utility list of the itemset at the second layer.

Figure 15:
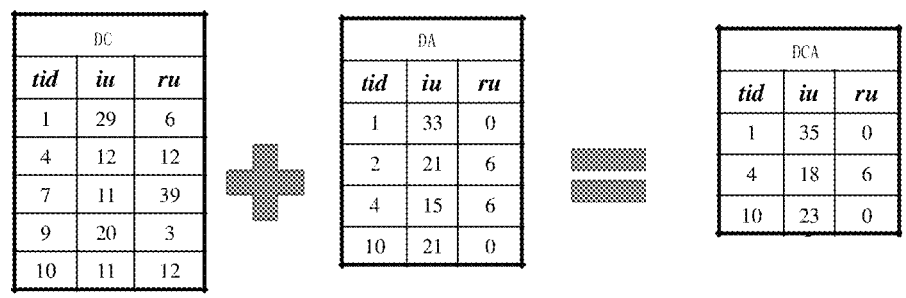
FIG. 15 is another schematic combination diagram of utility lists.

FIG. 15 is another schematic combination diagram of utility lists. For another example, a utility list of the itemset DCA at the third layer may be formed by combining utility lists of the itemsets DC and DA at the second layer, and a combination is shown in FIG. 15. When an itemset whose utility list may be determined is located at the third layer or a lower layer, there may be a difference between a process of constructing the utility list of the itemset and a process of constructing the utility list of the itemset at the second layer, and the difference lies in that: for utility of the itemset at the third layer or a lower layer in each target transaction, a sum of utility, in the target transaction, of two itemsets at a previous layer that can be combined into the itemset may be obtained, and utility of a prefix data item in the itemset in the target transaction further may be subtracted. For example, in FIG. 15, utility of the itemset DCA in a transaction T10 is utility being 11 of the DC in the transaction T10 plus utility being 21 of DA in the transaction T10 minus utility being 9 of a prefix data item D in the itemset DCA in T10, that is, 11+21−9=23. Correspondingly, RU of an itemset at the third layer or a lower layer in each target transaction is RU, in each target transaction, of an itemset that is ranked behind in two itemsets at a previous layer that can be combined into the itemset.

When a utility list of an itemset at the third layer or a lower layer is constructed, for each itemset at the third layer or a lower layer, two itemsets that are at a previous layer and that can be combined into the itemset may be determined; a same target transaction corresponding to the two itemsets is used as a target transaction corresponding to the itemset at the third layer or a lower layer; a result obtaining by subtracting, from a sum of utility of the two itemsets in one same corresponding target transaction, utility of a prefix data item in the itemset at the third layer or a lower layer in the target transaction is used as utility of the itemset at the third layer or a lower layer in the target transaction; and RU of an itemset that is ranked behind in the two itemsets in one same corresponding target transaction is used as RU of the itemset at the second layer in the target transaction, to obtain the utility list of the itemset at the third layer or a lower layer.

Corresponding, pseudocode for constructing the utility list corresponding to an itemset at each layer may be as follows. For an algorithm process, refer to Line 5 (in a case of k≥3, that is, in a case of a quantity of layers≥3) and Line 7 (in a case of k=1 or 2, that is, in a case of a quantity of layers=1 or 2) in the following code:

Input: X, an itemset; X.UL is the utility-list of X; Xab.UL, Xa.UL, Xb.UL, Xa⊆X and Xb⊆X, Xa≠Xb. //input: an itemset X; a utility list corresponding to X; a utility list corresponding to Xab; a utility list corresponding to Xa; and a utility list corresponding to Xb; Xa and Xb are both subsets of X, and Xa≠Xb Output: Xab.UL. //output: utility list of Xab 1: set Xab.UL←null. //set the utility list corresponding to Xab to null
2: for each element Ea∈Xa do
3: if ∃Ea∈Xb.UL∧Ea.TID:=Eb.TID then
4: search E∈X.UL∧E.TID:=Ea.TID.
5: Eab←<Ea.TID, Ea.iu+Eb.iu−E.iu,Eb.ru>. //for that Xa and Xb have a same data item, and the utility list corresponding to Xa and the utility list corresponding to Xb have a same transaction, construct a utility list of a K-itemset Xab (k≥3)
6: else
7: Eab←<Ea.TID, Ea.iu+Eb.iu, Eb.ru>. //for a process of generating, according to a 1-utility list corresponding to an 1-itemset, a 2-utility list corresponding to a 2-itemset, a TID in the 2-utility list is a TID corresponding to a data item Ea, iu is a sum of utility of the data item Ea and a data item Eb, and ru is RU corresponding to the data item Eb
8: end if
9: Xab.UL←Eab.
10: end for
11: return Xab.UL. //output the utility list of Xab.

Optionally, When a utility list of an itemset at the third layer or a lower layer is constructed, for each itemset at the third layer or a lower layer, at least two itemsets that are at a high layer and that can be directly combined into the itemset may be determined; a same target transaction corresponding to the at least two itemsets is used as a target transaction corresponding to the itemset at the third layer or a lower layer; a sum of utility of the at least two itemsets in one same corresponding target transaction is used as utility of the itemset at the third layer or a lower layer in the target transaction; and RU of an itemset in itemsets at the highest layer in the at least two itemsets that is ranked behind in one same corresponding target transaction is used as RU of the itemset at the second layer in the target transaction, to obtain the utility list of the itemset at the third layer or a lower layer.

Figure 16:
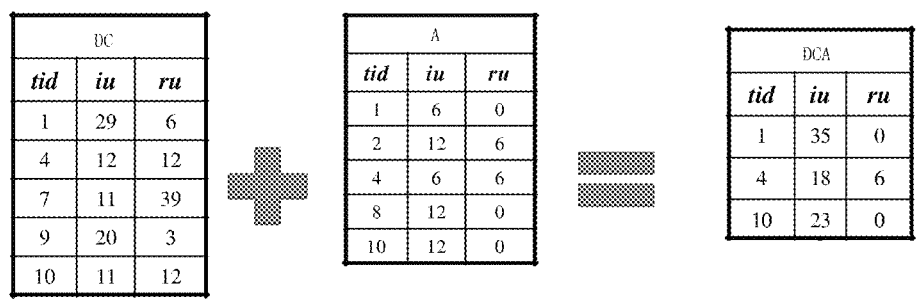
FIG. 16 is still another schematic combination diagram of utility lists.

FIG. 16 is still another schematic combination diagram of utility lists. For example, an itemset DCA may be combined by the itemset DC and the itemset A. Utility of the itemset DCA in each target transaction may be a sum of utility of the itemsets DC and A in the target transaction, and RU of the itemset DCA in each target transaction may be RU, in each target transaction, of the itemset A that is at the highest layer in the itemsets DC and A, and ranked behind. Details are shown in FIG. 16.

Optionally, after the utility list corresponding to each itemset is constructed, in an HUIM process, itemset utility of each itemset is calculated based on the utility list corresponding to each itemset; according to a predefined MMU threshold table, an LMU threshold corresponding to data items included in each itemset is used as an MIU threshold corresponding to each itemset; and the itemset utility of each itemset is compared with the corresponding MIU threshold, to obtain through mining an HUI according to a comparison result.

Pseudocode of an HUIM algorithm in this application may be shown with reference to the following algorithm 1 and algorithm 2.

---
Algorithm 1: HIMUEUCP Algorithm
---

Input: D, a transactional database: a transactional database to be processed;
ptable: a profit table; a utility table: MMU-table={mu (i1), mu (i2), . . . , mu (im)}, the user-specified multiple minimum utility threshold table: multiple minimum utility threshold table; EUCS: the estimated utility co-occurrence structure: an estimated utility co-occurrence structure table.
Output: The set of high-utility itemsets (HUIs): a set of high-utility itemsets.
/* X.UL, the utility-list of an itemset X */
//initialize three variables, and a set thereof is initialized to be a null set.
X.UL ← Ø, D.UL ← Ø, EUCS ← Ø.
//calculate an LMU value from the MMU-table
calculate the LMU from MMU-table.
//scan a database D, and calculate a TWU(i) value of each 1-itemset in the database D
scan D to calculate the TWU(i) value of each item i∈ I.
//find a candidate set I* of 1-itemsets, that is, a set of 1-itemsets satisfying a condition TWU(i)≥LMU, and herein, a pruning strategy 1 is used
find I*← {i∈I | TWU(i) ≥ LMU}, w.r.t. HTWUI1. /* strategy 1 */
//sort I*, that is a sequence≺ defined above, and sorting is performed in ascending order of minimum utility thresholds of 1-itemsets (1-item)
sort I* in the designed total order≺ .
//scan the database D again, construct a utility list X.UL for each 1-itemset in the set I*, and construct an EUCS.
scan D to build the X.UL structure of each 1-item i∈ I* and build the EUCS.
//call an HUI-Search function: HUI-Search (Ø, I*, MMU-table, EUCS)
call HUI-Search(Ø, I*, MMU-table, EUCS).
//return a set of high-utility itemsets
return HUIs ---
Algorithm 2: HUI-Search Procedure
---

Input: X, an itemset X; extensionsOfX, utility-lists of 1-extensions of X: utility lists of all 1-extension sets of the itemset X; MMU-table={mu(i1), mu(i2), . . . , mu(im)}: a multiple minimum utility threshold table; EUCS: the estimated utility co-occurrence structure: an estimated utility co-occurrence structure table.

---
Algorithm 2: HUI-Search Procedure
---

Output: The set of high-utility itemsets (HUIs): a set of high-utility itemsets.
/* X.UL, the utility-list of an itemset X */;
//the following operations are performed for each itemset in the set extensionsOfX for each pattern Xa ∈ extensionsOfX do
//calculate Xa.IU, Xa.RU, and MIU(Xa) from a constructed utility list Xa.UL of Xa
obtain the Xa.IU, Xa.RU and MIU(Xa) values from the built Xa.UL.
//if utility of Xa in a database is greater than or equal to a minimum utility
threshold self-defined for Xa,
if Xa.IU ≥ MIU(Xa) then
HUIs ← HUIsUXa. //classify Xa into sets HUIs of utility itemsets, and output
end if
//if Xa satisfies Xa.IU+Xa.RU is greater than or equal to a minimum utility threshold self-defined for Xa
if Xa.IU + Xa.RU ≥MIU(Xa) then /* strategy 2 */
//initialize a variable set extensionsOfX
extensionsOfXa ← Ø.
//for each itemset in the set extensionsOfX, if b is ranked behind a, for each itemset Xb ∈ extensionsOfX such that b after a do
//if Xa satisfies WU (a, b) ∈ EUCS ∧ TWU (a, b) ≥ MIU (Xa),
if ∃ TWU(a, b) ∈ EUCS ∧ TWU(a, b) ≥ MIU(Xa) then /* strategy 3 */
Xab ← XaUXb. //construct a new extension itemset Xab by using itemsets Xa and Xb
Xab.UL ← Construct (X, Xa, Xb) . //call a utility list construction function
//when the constructed utility list of Xab is not null,
if Xab.UL != Ø then
extensionsOfXa ← extensionsOfXaUXab.UL. //set classification
end if
end if
end for
//recursively call a function HUI-Search, and continue to perform a depth-first search
call HUI-Search(Xa, extensionsOfXa, MIU(Xa), EUCS).
end if
end for
return HUIs //return a set of high-utility itemsets In the foregoing algorithm 1, Line 1 is to initialize several variables; Line 2 is to calculate LMU by using an MMU table; an original database is scanned to calculate a TWU value of each 1-itemset (Line 3); a set HTWUI1 of 1-itemsets with HTWU is found according to an MMU threshold of each 1-itemset that is set in the MMU table (Line 4, herein, it is a global downward closure property (GDC property)); and Line 5 is to sort the found HTWUI1 in ascending order of MMU thresholds thereof.

Line 6 is to generate a 1-utility list according to the 1-itemset with HTWU; then, a mining function HUI-Search is called, a series of subsequent utility lists are generated recursively according to the 1-utility list (Line 7), and an HUI is obtained through mining from the generated utility list.

It may be learned that, in this embodiment of this application, when each itemset including one data item in the transactional database is determined, the determined itemsets are sorted at the first layer of the MIU tree in ascending order of the MMU thresholds, and an itemset located at the first layer of the MIU tree is constructed. The following manner may be used for implementation: calculating itemset TWU (a TWU value) of each itemset including one data item; determining, according to the MMU threshold of each itemset including one data item, HTWUIs in the itemsets each including one data item each; sorting the HTWUIs in ascending order of the MMU thresholds; and then, recursively generating a series of subsequent utility lists according to the utility list of each itemset including one data item, to form the utility list corresponding to each itemset.

Pseudocode of the function HUI-Search is shown in the algorithm 2, where in Line 5, a conditional downward closure property (CDC property) is applied to perform a pruning operation in advance, and in Line 8, the GDC property is used to perform a pruning operation.

Pruning strategy 1: When the MIU tree is traversed by a depth-first search, according to the utility list, if a TWU value of an itemset X is less than an LMU value, none of supersets of X is an HUI. A superset of an itemset is a set including all data items in the itemset. For example, for the itemset A, a superset of the itemset is all tree nodes including A in the foregoing diagram of the MIU tree, which are not just all sub nodes of the itemset A.

Pruning strategy 2: When the MIU tree is traversed by a depth-first search, according to the utility list, if a sum of utility and RU of an itemset X is less than an MIU threshold of the itemset X, none of extension nodes (that is, descendant nodes) of the itemset X is an HUI, because actual utility of each of the extension nodes is less than an MIU(X) value.

In this embodiment of this application, a utility list of an unpromising itemset in the generated utility lists of the itemsets may be filtered out, and a utility list of a corresponding extension set is generated according to a utility list of a remaining promising itemset, so that, during data mining, the database is only scanned once, and the utility list of each itemset at the first layer is generated. In addition, a utility list of another subsequent itemset may be generated according to the utility list of each itemset at the first layer, so that a quantity of times of scanning the database is reduced, and a range of data to be mined is reduced, thereby increasing a mining speed and saving a computing resource.

This embodiment of this application further provides two properties: the GDC property and the CDC property. Whether a corresponding itemset is promising is detected according to a utility list, and an unpromising itemset is filtered out, thereby reducing a quantity of subsequently generated utility lists, and achieving an effect of saving a computing resource and increasing a mining speed.

Optionally, in this embodiment of this application, in a process of constructing, by the depth-first search, the utility list corresponding to each itemset, an estimated utility co-occurrence pruning (EUCP) technology may be further used. Processing efficiency is improved by using an estimated utility co-occurrence structure (EUCS) table constructed when the transactional database is scanned the second time. The EUCS table includes the k-itemset and a TWU upper limit corresponding to the k-itemset, where k≥2, that is, the EUCS table may include each itemset at the second layer or a lower layer and a TWU upper limit corresponding to the itemset. The TWU upper limit is a sum of transaction utility upper limits corresponding to transactions including the k-itemset, and the transaction utility upper limit is a sum of utility of data items in the transaction.

For example, the EUCS constructed by using the database is shown in the following Table 8, where a method for calculating a TWU (TWU of an itemset) value of an itemset BE is obtaining a sum of utility of the itemset in the transaction T5 and utility of the itemset in the transaction T7, that is, 95.

TABLE 8

| | | EUCS table | | | |
|---|---|---|---|---|---|
| Data item | A | B | C | D | E |
| B | 0 | — | — | — | — |
| C | 97 | 91 | — | — | — |
| D | 109 | 135 | 155 | — | — |
| E | 51 | 95 | 97 | 169 | — |

According to the EUCS table, the k-itemset whose TWU upper limit<the MMU threshold and a superset thereof are filtered out, so that generation and determining of an extension itemset thereof can be directly ignored, thereby achieving performance of greatly increasing a mining speed, and ensuring completeness and accuracy of a mining result. A superset of an itemset is a set of all data items in the itemset. For the itemset A, a superset thereof is all tree nodes including the itemset A in the MIU tree, which are not just all sub nodes of the itemset A.

Based on the foregoing properties, in this embodiment of this application, the following deduction may be further obtained: If an itemset is an HTWUI, any sub itemset (the sub itemset includes all data items in the itemset) of the itemset is also an HTWUI. If an itemset is not an HTWUI, none of supersets of the itemset is an HTWUI.

Therefore, in this embodiment of this application, after itemsets each including one data item are obtained (that is, 1-itemsets are obtained), sorting may be performed in ascending order of MMU thresholds, to obtain sorted 1-itemsets. For example, after MMU thresholds of candidate itemsets that are in the 1-itemsets and that include data items A, B, C, D, and E are obtained according to Table 4, sorted 1-itemsets D, C, A, B, and E may be obtained in ascending order.

Next, according to the sorted 1-itemsets, 2-itemsets are generated successively. Apparently, data items in the 2-itemsets are sorted in ascending order of MMU thresholds of the 1-itemsets in the MMU table. A process of generating the 2-itemsets successively according to the 1-itemsets is combining a specified data item and a data item ranked on the right of the specified data item. For example, the sorted 1-itemsets are D, C, A, B, and E; and for subsequent extension of the itemset D, the 2-itemsets generated successively are DC, DA, DB, and DE.

TWU of each successively generated 2-itemset is calculated, for each 2-itemset, whether a sum of utility and RU of the itemset≥an MMU threshold of the itemset is detected, and if yes, a deep search continues to be performed; or if not, it is determined that none of the 2-itemset and a superset thereof is an HTWUI, and the 2-itemset is filtered out. Similarly, same processing is performed on another K-itemset (k≥3). Finally, an RUP algorithm returns a final and complete set of an HUI that is valid in a near term.

In this specification, an extension set of an itemset is an itemset generated after the itemset and each itemset ranked on the right of the itemset are successively combined, and a superset is a set including all data items in the itemset in the traditional sense.

In this embodiment of this application, after the HUI is determined, content may be recommended to a user, and the HUI is recommended.

According to the technical solutions provided in the embodiments of this application, when a common transactional database of a trade type or the like in daily application is processed, an MMU table is introduced, MIU corresponding to each itemset is determined according to the MMU table, and itemset utility of the itemset is compared with the corresponding MIU, to determine whether the itemset is an HUI, so that a problem that an HUI obtained through mining is inaccurate due to that in an existing HUIM based algorithm, whether itemset utility of an itemset is greater than a unique MMU threshold is used as a measurement criterion is resolved, and different HUI measurement criteria are formulated according to different itemsets. In this way, an HUI obtained through mining is more accurate, more credible, and more meaningful.

An embodiment of this application further provides an HUIM apparatus. Cross-reference may be correspondingly made to the HUIM apparatus described below and the HUIM method described above.

Figure 17:
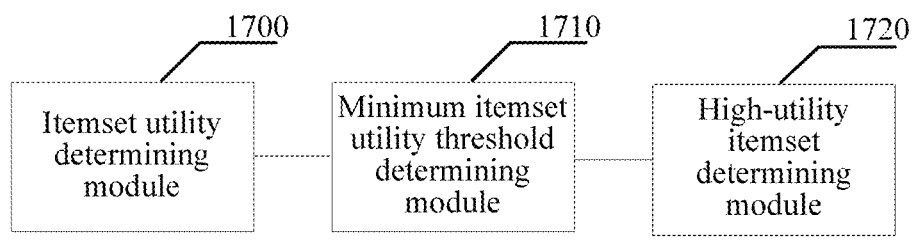
FIG. 17 is a structural block diagram of an HUIM apparatus according to an embodiment.

FIG. 17 is a structural block diagram of an HUIM apparatus according to an embodiment. The apparatus includes:

an itemset utility determining module 1700, configured to determine itemset utility corresponding to each itemset in a transactional database, itemset utility corresponding to one itemset indicating a sum of utility of the itemset in target transactions corresponding to the itemset; a target transaction of one itemset being a transaction including all data items in the itemset; and utility of one itemset in a target transaction indicating a sum of utility of data items in the itemset in the target transaction;

an MIU threshold determining module 1710, configured to determine, according to a predefined MMU threshold table, an MIU threshold corresponding to each itemset, the predefined MMU threshold table recording an MMU threshold corresponding to each data item, and an MIU threshold table corresponding to one itemset indicating an LMU threshold in MMU thresholds corresponding to data items included in the itemset; and an HUI determining module 1720, configured to compare the itemset utility of each itemset with the corresponding MIU threshold, and determine an HUI according to a comparison result, itemset utility of the HUI being not less than the corresponding MIU threshold.

Figure 18:
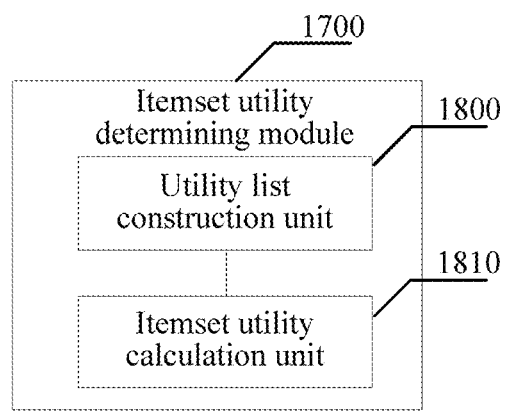
FIG. 18 is a structural block diagram of an itemset utility determining module according to an embodiment.

FIG. 18 is a structural block diagram of an itemset utility determining module according to an embodiment. In detail, FIG. 18 shows an optional structure of the itemset utility determining module 1700. As shown in FIG. 18, the itemset utility determining module 1700 may include:

a utility list construction unit 1800, configured to construct, in a recursive manner according to corresponding external utility of each data item in each transaction and intrinsic utility of each data item that is recorded in the predefined MMU threshold table, a utility list corresponding to each itemset, where a utility list corresponding to one itemset records a TID of each target transaction corresponding to the itemset, corresponding utility of the itemset in each target transaction, and RU of the itemset in each target transaction; an RU of one itemset in a transaction indicates a sum of utility of data items ranked on the right of the transaction that is obtained after data items in the transaction are sorted in ascending order of MMU thresholds; and a data item included in the itemset is removed from the transaction; and an itemset utility calculation unit 1810, configured to calculate the itemset utility of each itemset according to the utility list corresponding to each itemset.

Optionally, when constructing, in a recursive manner, the utility list corresponding to each itemset, the utility list construction unit 1800 may be configured to: construct, in a layered manner and in a recursive manner, the utility list corresponding to each itemset, where a layer ordinal number of one itemset corresponds to a quantity of data items included in the itemset; and construct a utility list corresponding to a next-layer itemset by using utility lists of at least two high-layer itemsets that can be combined into the itemset.

Figure 19:
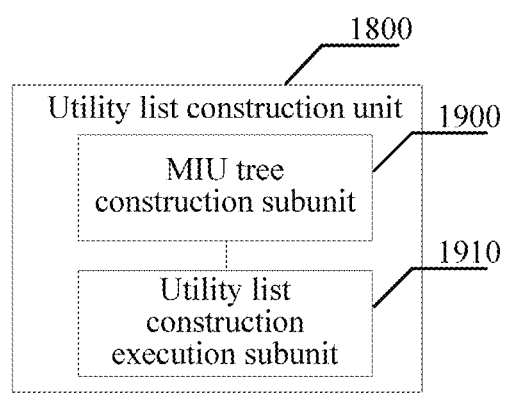
FIG. 19 is a structural block diagram of a utility list construction unit according to an embodiment.

FIG. 19 is a structural block diagram of a utility list construction unit according to an embodiment. In detail, FIG. 19 shows an optional structure of the utility list construction unit 1800. As shown in FIG. 19, the utility list construction unit 1800 may include:

an MIU tree construction subunit 1900, configured to construct an enumeration MIU tree, where the MIU tree includes layered itemsets; a layer ordinal number of one itemset in the MIU tree corresponds to a quantity of data items included in the itemset; and itemsets at layers are sorted in ascending order of MMU thresholds; and an utility list construction execution subunit 1910, configured to: construct, based on the corresponding external utility of each data item in each transaction and the intrinsic utility of each data item, a utility list corresponding to each itemset combined with the MIU tree; and construct a utility list corresponding to a next-layer itemset by using utility lists of at least two high-layer itemsets that can be combined into the itemset.

The MIU tree construction subunit 1900 may be configured to: determine each itemset that is in the transactional database and that includes one data item, and sort the determined itemsets at the first layer of the MIU tree in ascending order of MMU thresholds, to construct itemsets located at the first layer of the MIU tree; and construct layered itemsets by a depth-first search, and sequentially starting from the itemsets at the first layer of the MIU tree, and make a layer ordinal number of one itemset in the MIU tree correspond to a quantity of data items included in the itemset, where itemsets at layers are sorted in ascending order of MMU thresholds, to form the MIU tree.

Optionally, the utility list construction execution subunit 1910 may be configured to: determine, when a utility list of each itemset at the second layer is constructed, for each itemset at the second layer, two itemsets that are at the first layer and that can be combined into the itemset at the second layer; use a same target transaction corresponding to the two itemsets as a target transaction corresponding to the itemset at the second layer; use a sum of utility of the two itemsets in one same corresponding target transaction as utility of the itemset at the second layer in the target transaction; and use RU of an itemset that is ranked behind in the two itemsets in one same corresponding target transaction as RU of the itemset at the second layer in the target transaction.

Optionally, the utility list construction execution subunit 1910 may be further configured to: determine, when a utility list of an itemset at the third layer or a lower layer is constructed, for each itemset at the third layer or a lower layer, two itemsets that are at a previous layer and that can be combined into the itemset; use a same target transaction corresponding to the two itemsets as a target transaction corresponding to the itemset at the third layer or a lower layer; use a result obtaining by subtracting, from a sum of utility of the two itemsets in one same corresponding target transaction, utility of a prefix data item in the itemset at the third layer or a lower layer in the target transaction, as utility of the itemset at the third layer or a lower layer in the target transaction; and use RU of an itemset that is ranked behind in the two itemsets in one same corresponding target transaction as RU of the itemset at the second layer in the target transaction.

Optionally, when determining each itemset that is in the transactional database and that includes one data item, and sorting the determined itemsets at the first layer of the MIU tree in ascending order of the MMU thresholds, to construct the itemset located at the first layer of the MIU tree, the MIU tree construction subunit 1900 may be configured to: calculate itemset TWU of each itemset including one data item; determine, according to the MMU thresholds of the itemsets each including one data item, HTWUIs in the itemsets each including one data item; and sort the HTWUIs in ascending order of MMU thresholds.

Correspondingly, when constructing the utility list corresponding to the itemsets combined with the MIU tree, the utility list construction execution subunit 1910 may be configured to: construct a utility list of each itemset including one data item; and recursively generate a series of subsequent utility lists according to the utility list of each itemset including one data item, to form the utility list corresponding to each itemset.

In this embodiment of this application, the HUIM apparatus may be further configured to: determine, when the MIU tree is traversed by a depth-first search, if TWU of an itemset is less than an LMU threshold of the itemset, that none of supersets of the itemset is an HUI; and/or determine, when the MIU tree is traversed by a depth-first search, if a sum of utility and RU of an itemset is less than an MIU threshold of the itemset, that none of extension nodes of the itemset in the MIU tree is an HUI.

Optionally, in this embodiment of this application, the HUIM apparatus may be further configured to: obtain an EUCS table, where the EUCS table includes each itemset at the second layer or a lower layer and a TWU upper limit corresponding to the itemset; and filter out, according to the EUCS table, an itemset whose TWU upper limit is less than an MMU threshold and that is at the second layer or a lower layer and a superset of the itemset.

Optionally, in this embodiment of this application, the HUIM apparatus may be further configured to: determine, if an itemset is an HTWUI, that any sub itemset of the itemset is also an HTWUI, where the sub itemset includes all data items in the itemset; or determine, if an itemset is not an HTWUI, that none of supersets of the itemset is an HTWUI.

An embodiment of this application further provides a data processing device. The data processing device may include the HUIM apparatus.

Figure 20:
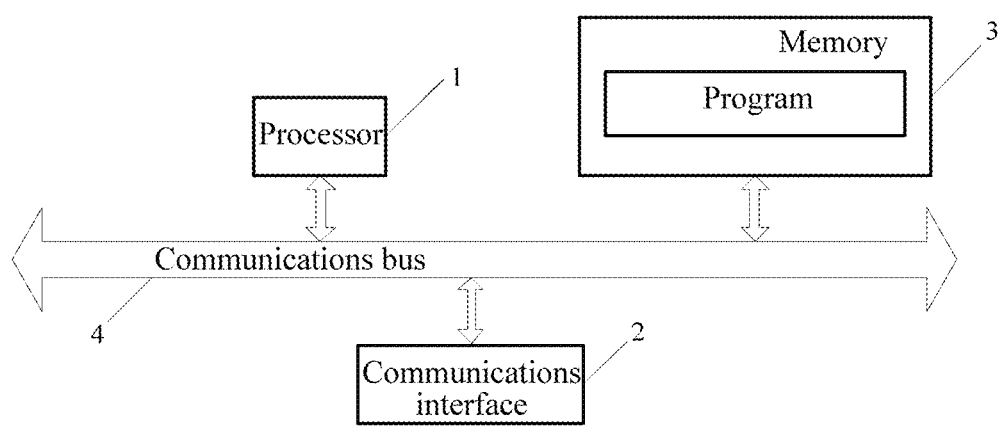
FIG. 20 is a block diagram of a hardware structure of a data processing device according to an embodiment.

FIG. 20 is a block diagram of a hardware structure of a data processing device according to an embodiment. The data processing device may include a processor 1, a communications interface 2, a memory 3, and a communications bus 4.

The processor 1, the communications interface 2, and the memory 3 complete mutual communication by using the bus communications bus 4.

Optionally, the communications interface 2 may be an interface of a communications module, for example, an interface of a GSM module.

The processor 1 is configured to execute a program.

The memory 3 is configured to store the program.

The program may include program code, where the program code includes a computer operation instruction.

The processor 1 may be a CPU or an ASIC, or one or more integrated circuits configured to implement the embodiments of this application.

The memory 3 may include a high speed RAM, and may also include a non-volatile memory, such as at least one magnetic disk storage.

The program may be configured to: determine itemset utility corresponding to each itemset in a transactional database, itemset utility corresponding to one itemset indicating a sum of utility of the itemset in target transactions corresponding to the itemset; a target transaction of one itemset being a transaction including all data items in the itemset, and utility of one itemset in a target transaction indicating a sum of utility of data items in the itemset in the target transaction;

determine, according to a predefined MMU threshold table, an MIU threshold corresponding to each itemset, the predefined MMU threshold table recording an MMU threshold corresponding to each data item, and an MIU threshold table corresponding to one itemset indicating an LMU threshold in MMU thresholds corresponding to data items included in the itemset; and compare the itemset utility of each itemset with the corresponding MIU threshold, and determine an HUI according to a comparison result, itemset utility of the HUI being not less than the corresponding MIU threshold.

An embodiment of this application further provides an HUIM device. The device includes a processor and a memory, the memory being configured to store a computer program, and the processor being configured to read the computer program, to execute an executable instruction, the executable instruction being used to implement the HUIM method. An embodiment of this application further provides a storage medium, the storage medium being configured to store program code, and the program code being used to perform the HUIM method.

An embodiment of this application further provides a computer program product including instructions, when run in a computer, the instructions causing the computer to perform the HUIM method.

In this specification, the terms "include," "comprise," and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by the sentence "include a/an . . . " does not exclude other same elements existing in the process, method, object, or device that includes the element. The embodiments in this specification are all described in a progressive manner. Description of each of the embodiments focuses on differences from other embodiments, and for same or similar parts in the embodiments, refer to these embodiments. The apparatuses disclosed in the embodiments correspond to the method disclosed in the embodiments and therefore are briefly described, and for the associated part, refer to the method.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

The above description of the disclosed embodiments enables a person skilled in the art to implement or use the disclosure. Various modifications to these embodiments are obvious to a person skilled in the art, and the principles defined in the disclosure may be implemented in other embodiments without departing from the spirit and scope of the disclosure. Therefore, the inventive concepts are not limited to these embodiments illustrated in the disclosure, but may conform to the broadest scope consistent with the principles and novel features disclosed in the disclosure.

What is claimed is:

1. A pattern mining method, the pattern mining method being performed by a server, and the pattern mining method comprising:
   obtaining, according to each of transactions comprised in a transactional database, a candidate pattern set satisfying a condition, each of the transactions comprising at least one item, each of candidate patterns in the candidate pattern set comprising one or more items in an itemset, and the itemset being generated according to the at least one item in each of the transactions;
   for each of the candidate patterns in the candidate pattern set, calculating a utility of a respective one of the candidate patterns in each of the transactions;
   determining, among the transactions, at least one target transaction in which the utility reaches a specified utility threshold;
   determining a target period value of a target candidate pattern corresponding to the at least one target transaction, according to a target time attribute of each of the at least one target transaction; and
   determining the target candidate pattern as a mining result, based on the target period value of the target candidate pattern being less than or equal to a period threshold,
   wherein the obtaining the candidate pattern set comprises:
      scanning each of the transactions in the transactional database;
      obtaining, in the transactions that are scanned, an obtained item having a sum of utilities that reaches an extension utility threshold greater than or equal to the specified utility threshold
      forming a first-layer candidate pattern set that is a high transaction weighted utilization and short periodic itemset (HTWUSPI$^1$), using the obtained item;
      recording a corresponding transaction that each of the one or more items in the itemset is in, and a utility of each of the transactions;
      generating a kth-layer candidate pattern set HTWUSPI$^k$ in a layer-by-layer manner, using an Apriori_gen function and the first-layer candidate pattern set HTWUSPI$^1$, until a (k+1)th-layer candidate pattern set HTWUSPI$^{k+1}$ is null; and
      forming the candidate pattern set, using the first-layer candidate pattern set HTWUSPI$^1$ to the kth-layer candidate pattern set HTWUSPI$^k$, and
   wherein the generating the kth-layer candidate pattern set HTWUSPI$^k$ comprises:
      combining every two candidate patterns in a (k−1)th-layer candidate pattern set HTWUSPI$^{k-1}$, to obtain several candidate pattern pairs;
      selecting, from the several candidate pattern pairs, selected candidate pattern pairs comprising k−2 same items;
      combining the selected candidate pattern pairs, to obtain an initial candidate pattern;
      determining one or more transactions that each item comprised in the initial candidate pattern is in;
      determining an intersection set of the one of more transactions;
      determining at least one initial transaction in the intersection set, as the at least one initial transaction that the initial candidate pattern is in; and
      adding the initial candidate pattern to the kth-layer candidate pattern set HTWUSPI$^k$, based on a sum of utilities of the at least one initial transaction that the initial candidate pattern is in reaching the extension utility threshold.

2. The pattern mining method according to claim 1, wherein the determining the target period value of the target candidate pattern comprises:
   calculating a time difference between each pair of adjacent target transactions, according to the target time attribute of each of the at least one target transaction; and
   determining a largest time difference among the time difference between each pair of the adjacent target transactions, as the target period value of the target candidate pattern.

3. The pattern mining method according to claim 2, wherein the calculating the time difference between each pair of the adjacent target transactions comprises, for one or more target transactions that are sequentially sorted in the transactional database:
   calculating, based on no other target transaction existing before a current target transaction in the transactional database, the time difference between the current target transaction and a first transaction in the transactional database;
   calculating, based on no other target transaction existing after the current target transaction, the time difference between a last transaction in the transactional database and the current target transaction; and
   calculating, based on a previous adjacent target transaction in the transactional database existing before the current target transaction, the time difference between the current target transaction and the previous adjacent target transaction.

4. The pattern mining method according to claim 1, wherein the adding the initial candidate pattern to the kth-layer candidate pattern set HTWUSPI$^k$ comprises:
   calculating the sum of the utilities of the at least one initial transaction that the initial candidate patterns is in;
   determining an initial period value of the initial candidate pattern, according to an initial time attribute of each of the at least one initial transaction that the initial candidate pattern is in; and
   adding the initial candidate pattern to the kth-layer candidate pattern set HTWUSPI$^k$, based on the sum of the utilities of the at least one initial transaction that the initial candidate pattern is in reaching the extension utility threshold, and the initial period value of the initial candidate pattern being less than or equal to the period threshold.

5. The pattern mining method according to claim 1, further comprising, after the recording the corresponding transaction that each of the one or more items is in, and the utility of each of the transactions:
   determining a low-utility transaction having a transaction utility less than the specified utility threshold; and
   deleting the low-utility transaction from the corresponding transaction that each of the one or more items is in.

6. A pattern mining apparatus, comprising:
at least one memory configured to store computer program code; and
at least one processor configured to access the at least one memory and operate according to the computer program code, the computer program code comprising:
candidate pattern set obtaining code configured to cause the at least one processor to obtain, according to each of transactions comprised in a transactional database, a candidate pattern set satisfying a condition, each of the transactions comprising at least one item, each of candidate patterns in the candidate pattern set comprising one or more items in an itemset, and the itemset being generated according to the at least one item in each of the transactions;
utility calculation code configured to cause the at least one processor to, for each of the candidate patterns in the candidate pattern set, calculate a utility of a respective one of the candidate patterns in each of the transactions;
target transaction determining code configured to cause the at least one processor to determine, among the transactions, at least one target transaction in which the utility reaches a specified utility threshold;
candidate pattern period value determining code configured to cause the at least one processor to determine a target period value of a target candidate pattern corresponding to the at least one target transaction, according to a target time attribute of each of the at least one target transaction; and
mining result determining code configured to cause the at least one processor to determine the target candidate pattern as a mining result, based on the target period value of the target candidate pattern being less than or equal to a period threshold,
wherein candidate pattern set obtaining code is further configured to cause the at least one processor to:
scan each of the transactions in the transactional database;
obtain, in the transactions that are scanned, an obtained item having a sum of utilities that reaches an extension utility threshold greater than or equal to the specified utility threshold
form a first-layer candidate pattern set that is a high transaction weighted utilization and short periodic itemset (HTWUSPI$^1$), using the obtained item;
record a corresponding transaction that each of the one or more items in the itemset is in, and a utility of each of the transactions;
generate a kth-layer candidate pattern set HTWUSPI$^k$ in a layer-by-layer manner, using an Apriori_gen function and the first-layer candidate pattern set HTWUSPI$^1$, until a (k+1)th-layer candidate pattern set HTWUSPI$^{k+1}$ is null; and
form the candidate pattern set, using the first-layer candidate pattern set HTWUSPI$^1$ to the kth-layer candidate pattern set HTWUSPI$^k$, and
wherein the candidate pattern set obtaining code is further configured to cause the at least one processor to:
combine every two candidate patterns in a (k−1)th-layer candidate pattern set HTWUSPI$^{k-1}$, to obtain several candidate pattern pairs;
select, from the several candidate pattern pairs, selected candidate pattern pairs comprising k−2 same items;
combine the selected candidate pattern pairs, to obtain an initial candidate pattern;
determine one or more transactions that each item comprised in the initial candidate pattern is in;
determine an intersection set of the one of more transactions;
determine at least one initial transaction in the intersection set, as the at least one initial transaction that the initial candidate pattern is in; and
add the initial candidate pattern to the kth-layer candidate pattern set HTWUSPI$^k$, based on a sum of utilities of the at least one initial transaction that the initial candidate pattern is in reaching the extension utility threshold.

7. The pattern mining apparatus according to claim 6, wherein the candidate pattern period value determining code is further configured to cause the at least one processor to:
calculate a time difference between each pair of adjacent target transactions, according to the target time attribute of each of the at least one target transaction; and
determine a largest time difference among the time difference between each pair of the adjacent target transactions, as the target period value of the target candidate pattern.

8. The pattern mining apparatus according to claim 7, wherein the candidate pattern period value determining code is further configured to cause the at least one processor to:
calculate, based on no other target transaction existing before a current target transaction in the transactional database, the time difference between the current target transaction and a first transaction in the transactional database;
calculate, based on no other target transaction existing after the current target transaction, the time difference between a last transaction in the transactional database and the current target transaction; and
calculate, based on a previous adjacent target transaction in the transactional database existing before the current target transaction, the time difference between the current target transaction and the previous adjacent target transaction.

9. The pattern mining apparatus according to claim 6, wherein the candidate pattern set obtaining code is further configured to cause the at least one processor to:
calculate the sum of the utilities of the at least one initial transaction that the initial candidate patterns is in;
determine an initial period value of the initial candidate pattern, according to an initial time attribute of each of the at least one initial transaction that the initial candidate pattern is in; and
add the initial candidate pattern to the kth-layer candidate pattern set HTWUSPI$^k$, based on the sum of the utilities of the at least one initial transaction that the initial candidate pattern is in reaching the extension utility threshold, and the initial period value of the initial candidate pattern being less than or equal to the period threshold.

10. The pattern mining apparatus according to claim 6, wherein the candidate pattern set obtaining code is further configured to cause the at least one processor to, after the recording the corresponding transaction that each of the one or more items is in, and the utility of each of the transactions:
determine a low-utility transaction having a transaction utility less than the specified utility threshold; and
delete the low-utility transaction from the corresponding transaction that each of the one or more items is in.

11. A non-transitory computer-readable storage medium storing instructions that cause a processor to perform the pattern mining method according to claim 1.

12. A high-utility itemset mining (HUIM) method, the HUIM method being performed by a server, and the HUIM method comprising:
   determining an itemset utility corresponding to each of itemsets in a transactional database, the itemset utility indicating a sum of utilities of target transactions corresponding to a respective one of the itemsets, each of the target transactions comprising data items in the respective one of the itemsets, and a utility of one of the target transactions indicates a sum of utilities of the data items;
   determining, according to a predefined minimum utility (MMU) threshold table, a minimum itemset utility (MIU) threshold corresponding to each of the itemsets, the predefined MMU threshold table recording an MMU threshold corresponding to each data item, and an MIU threshold table corresponding to one itemset indicating a least minimum utility (LMU) threshold among MMU thresholds corresponding to data items comprised in the one itemset;
   comparing the itemset utility of each of the itemsets with the MIU threshold; and
   determining a high-utility itemset (HUI), according to a result of the comparing, an itemset utility of the HUI being not less than the MIU threshold,
   wherein the determining the itemset utility comprises:
      constructing, in a recursive manner, according to a corresponding external utility of each data item in each transaction and an intrinsic utility of each data item that is recorded in the predefined MMU threshold table, a utility list corresponding to each of the itemsets, wherein a utility list corresponding to a respective one of the itemsets records a transaction identifier (TID) of each target transaction corresponding to the respective one of the itemsets, a corresponding utility of the respective one of the itemsets in each target transaction, and a remaining utility (RU) of the respective one of the itemsets in each target transaction, and the RU indicates a sum of utilities of data items ranked on a right of a transaction that is obtained after data items in the transaction are sorted in ascending order of MMU thresholds and a data item comprised in the respective one of the itemsets is removed from the transaction; and
      calculating the itemset utility of each of the itemsets, according to the utility list corresponding to each of the itemsets,
   wherein the constructing, in the recursive manner, the utility list corresponding to each of the itemsets comprises:
      constructing, in a layered manner and in the recursive manner, the utility list corresponding to each of the itemsets, wherein a layer ordinal number of the respective one of the itemsets corresponds to a quantity of the data items comprised in the respective one of the itemsets; and
      constructing a utility list corresponding to a next-layer itemset, using utility lists of at least two high-layer itemsets that are combined into the respective one of the itemsets,
   wherein the constructing, in the layered manner and in the recursive manner, the utility list corresponding to each of the itemsets comprises:
      constructing an enumeration MIU tree, wherein the enumeration MIU tree comprises layered itemsets, a layer ordinal number of one itemset in the enumeration MIU tree corresponds to a quantity of data items comprised in the one itemset, and the layered itemsets are sorted in ascending order of MMU thresholds;
      constructing, based on the external utility of each data item in each transaction and the intrinsic utility of each data item, a utility list corresponding to each of the itemsets combined with the MIU tree; and
      constructing a utility list corresponding to a next-layer itemset, using utility lists of at least two high-layer itemsets that are combined into the respective one of the itemsets.

13. The HUIM method according to claim 12, wherein the constructing the enumeration MIU tree comprises:
   determining each of the itemsets that comprises one data item;
   sorting the determined itemsets at the first layer of the MIU tree in ascending order of MMU thresholds, to construct itemsets located at the first layer of the MIU tree;
   constructing the layered itemsets by a depth-first search;
   sequentially starting from the itemsets at the first layer of the MIU tree; and
   making a layer ordinal number of one itemset in the MIU tree correspond to a quantity of data items comprised in the itemset, wherein itemsets at layers are sorted in ascending order of MMU thresholds, to form the MIU tree.

14. The HUIM method according to claim 12, wherein the constructing the utility list corresponding to the next-layer itemset comprises:
   determining, based on a utility list of each itemset at a second layer being constructed, for each itemset at the second layer, two itemsets that are at the first layer and that are combined into the itemset at the second layer;
   using a same target transaction corresponding to the two itemsets as a target transaction corresponding to the itemset at the second layer;
   using a sum of utilities of the two itemsets in one same corresponding target transaction as utility of the itemset at the second layer in the target transaction; and
   using an RU of an itemset that is ranked behind in the two itemsets in one same corresponding target transaction as an RU of the itemset at the second layer in the target transaction.

15. The HUIM method according to claim 12, wherein the constructing the utility list corresponding to the next-layer itemset comprises:
   determining, based on a utility list of an itemset at a third layer or a lower layer being constructed, for each itemset at the third layer or a lower layer, two itemsets that are at a previous layer and that are combined into the itemset;
   using a same target transaction corresponding to the two itemsets as a target transaction corresponding to the itemset at the third layer or a lower layer;
   using a result obtaining by subtracting, from a sum of utilities of the two itemsets in one same corresponding target transaction, a utility of a prefix data item in the itemset at the third layer or a lower layer in the target transaction, as a utility of the itemset at the third layer or a lower layer in the target transaction; and
   using an RU of an itemset that is ranked behind in the two itemsets in one same corresponding target transaction as an RU of the itemset at the second layer in the target transaction.

* * * * *